United States Patent [19]

Cargile et al.

[11] Patent Number: 4,819,267
[45] Date of Patent: Apr. 4, 1989

[54] SOLID STATE KEY FOR CONTROLLING ACCESS TO COMPUTER SYSTEMS AND TO COMPUTER SOFTWARE AND/OR FOR SECURE COMMUNICATIONS

[75] Inventors: William P. Cargile, Half Moon Bay; Richard D. Freeman, Sunnyvale; James M. Lyon, San Jose, all of Calif.

[73] Assignee: Thumbscan, Inc., Oakbrook Terr., Ill.

[21] Appl. No.: 62,322

[22] Filed: Jun. 9, 1987

Related U.S. Application Data

[63] Continuation of Ser. No. 813,647, Dec. 26, 1985, abandoned, which is a continuation-in-part of Ser. No. 582,302, Feb. 22, 1984, Pat. No. 4,599,489.

[51] Int. Cl.$^4$ .............................................. H04L 9/04
[52] U.S. Cl. ....................................... 380/23; 380/25; 380/44; 380/47
[58] Field of Search ................... 380/23, 25, 28, 43–47

[56] References Cited

U.S. PATENT DOCUMENTS

| | | | |
|---|---|---|---|
| 4,369,332 | 11/1983 | Campbell, Jr. | 778/22.07 |
| 4,471,163 | 9/1984 | Donald et al. | 364/200 |
| 4,484,025 | 11/1984 | Ostermann et al. | 380/49 |
| 4,484,027 | 11/1984 | Lee et al. | 178/22.16 |
| 4,523,271 | 6/1985 | Levien | 364/200 |
| 4,573,119 | 2/1986 | Westheimer et al. | 364/200 |
| 4,593,353 | 6/1986 | Pickholz | 364/200 |
| 4,596,898 | 6/1986 | Pemmaraju | 178/22.16 |
| 4,599,489 | 7/1986 | Cargile | 178/22.08 |
| 4,609,777 | 9/1986 | Cargile | 178/22.08 |
| 4,689,606 | 8/1987 | Sato | 380/46 |
| 4,720,860 | 1/1988 | Weiss | 380/23 |

FOREIGN PATENT DOCUMENTS 0234100  9/1987  European Pat. Off. .............. 380/23

Primary Examiner—Salvatore Cangialosi
Attorney, Agent, or Firm—Fliesler, Dubb, Meyer & Lovejoy

[57] ABSTRACT

A semiconductor device that functions as a key to control access to a computer or a software program resident in a computer or provides for secure communications is disclosed. The device executes an algorithm that combines a root and a seed to produce a password. The password is input to the computer. The computer uses an equivalent algorithm to produce a password within the computer. Comparison or other methods are employed to allow access to the computer or computer program or to allow for secure communications. The computer can be coded to produce on a video display thereof a time-space stimulus pattern which can be received by sensors of the key. Alternatively, a keypad can be employed to input the stimulus output from the computer into the access key. Further the present system allows for secure communication using algorithms between different computers and between distant locations.

17 Claims, 14 Drawing Sheets

Fig_4

| FLIP-FLOP ID | 100a | 100b | 100c | 100d | |
|---|---|---|---|---|---|
| OUTPUT STATE(Q) | 0 | 1 | 0 | 1 | }140 |
| FLIP-FLOP ID | 106a | 106b | 106c | 106d | |
| OUTPUT STATE(Q) (DAY 0) | 1 | 1 | 0 | 0 | }142 |
| FLIP-FLOP ID | 116a | 116b | 116c | 116d | |
| INITIAL | 0 | 0 | 0 | 0 | }144 |
| STIM NUM = 1 CLOCK 1 | 1 | 1 | 1 | 0 | |
| STIM NUM = 1 CLOCK 2 | 1 | 0 | 0 | 1 | |
| STIM NUM = 1 CLOCK 3 | 0 | 0 | 1  $18_1$ | 0 | }146 |
| STIM NUM = 0 CLOCK 4 | 0 | 1 | [1 | 1] | |
| INITIAL | 0 | 0 | 0 | 0 | |
| STIM NUM = 0 CLOCK 1 | 0 | 1 | 1 | 0 | |
| STIM NUM = 1 CLOCK 2 | 1 | 1 | 0 | 1 | |
| STIM NUM = 0 CLOCK 3 | 1 | 0 | 0  $18_2$ | 0 | }148 |
| STIM NUM = 0 CLOCK 4 | 0 | 0 | [1 | 0] | |
| FLIP-FLOP ID | 106a | 106b | 106c | 106d | |
| OUTPUT STATE(Q) (DAY 1) | 0 | 1 | 1 | 0 | }150 |
| FLIP-FLOP ID | 116a | 116b | 116c | 116d | |
| INITIAL | 0 | 0 | 0 | 0 | |
| STIM NUM = 1 CLOCK 1 | 1 | 0 | 1 | 1 | |
| STIM NUM = 1 CLOCK 2 | 0 | 1 | 1 | 0 | |
| STIM NUM = 1 CLOCK 3 | 1 | 0 | 0  $18_3$ | 0 | }152 |
| STIM NUM = 1 CLOCK 4 | 1 | 1 | [1 | 1] | |

*FIG. 5*

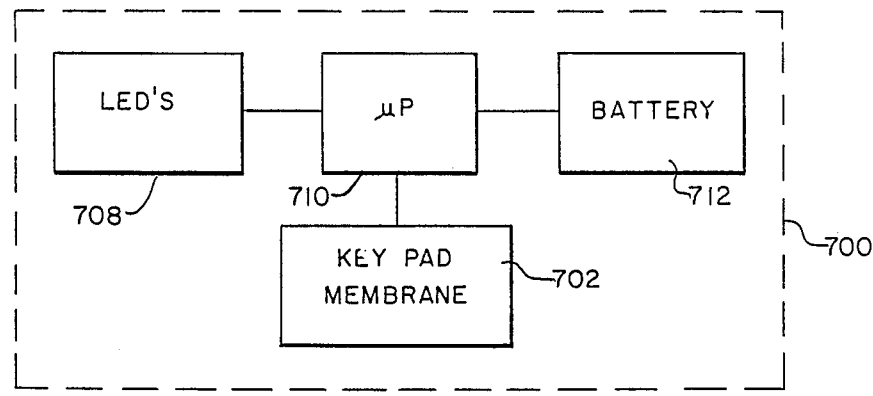
FIG.—15
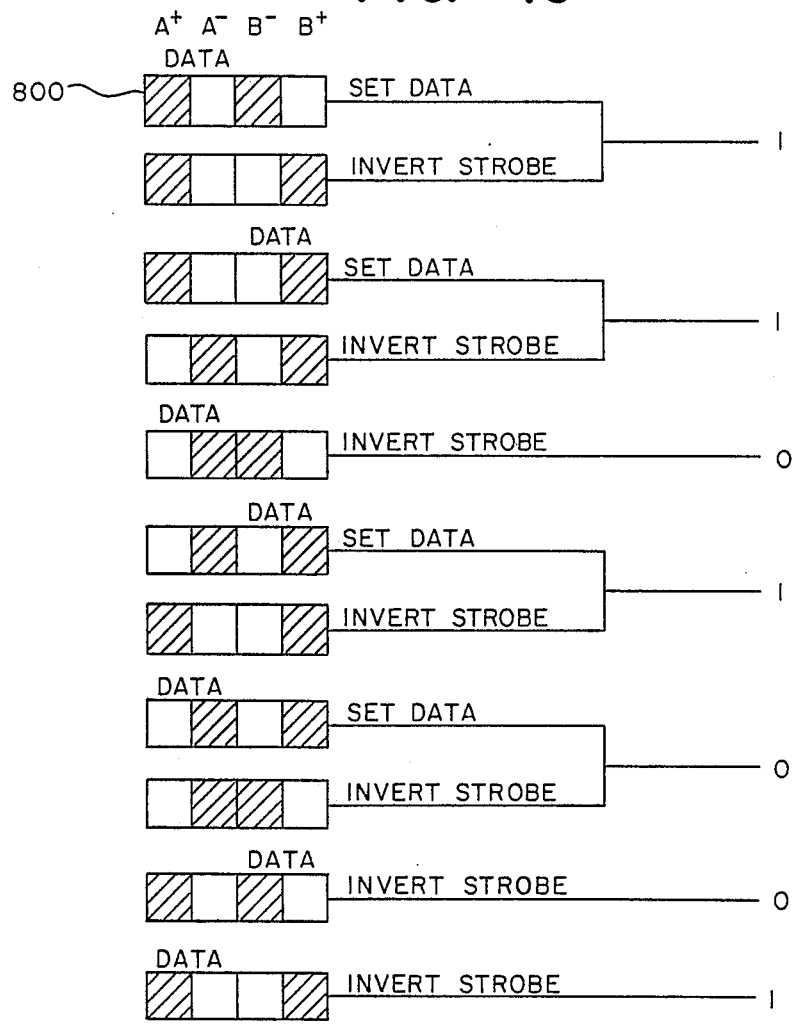
FIG.—16

SOLID STATE KEY FOR CONTROLLING ACCESS TO COMPUTER SYSTEMS AND TO COMPUTER SOFTWARE AND/OR FOR SECURE COMMUNICATIONS

CONTINUATION-IN-PART CROSS-REFERENCE

This application is a continuation of application Ser. No. 813,647, filed on Dec. 26, 1985, now abandoned which is a continuation-in-part of a prior co-pending application entitled "Solid State Key for Controlling Access to Computer Software," filed on Feb. 22, 1984, and given Ser. No. 582,302, now U.S. Pat. No. 4,599,489.

FIELD OF THE INVENTION

This invention relates to apparatus for affording access to computer systems and/or computer software only by authorized persons and also for secure communications of data, and more particularly to apparatus physically independent of the computer but capable of executing an algorithm that can also be executed by the computer to afford access or secure communications of data.

BACKGROUND OF THE INVENTION

Numerous techniques for limiting access to computer systems (also known as access management) and software (also known as software protection), and for enabling secure communications of data are practiced. In multiuser systems it is typical for each user to have an identification code and/or a password which the user must enter before gaining access to the system. Security of the system can be compromised when an authorized user reveals his or her identification code and/or password to unauthorized persons or the access code is discovered by a systematic attack such as that used by hackers.

Another technique employed, particularly with respect to application software that is provided on magnetic diskettes, is to encode on the diskette a protective routine that prevents the making of usable copies with standard copy methods. This technique has had only moderate success in preventing unauthorized use or unauthorized copying because programs for disabling such protective routines are widely available.

Further techniques for securing computers, software and communications include the use of seemingly random generated passwords affording the appropriate access. In some systems, these passwords are generated independently of where access is desired and in other systems the random passwords are generated in response to an inquiry or stimulus from the computer, software or communication source to which access is desired. For these types of systems, there are a number of approaches used by hackers and those intent on stealing valuable information in order to break into the system. One of the approaches is known as the "table attack" or "clear text attack." In the table attack, a table is built out of the relationship between the stimulus and the response or password generated therefrom. If the system for controlling access is relative static, a table can be built in a relatively short time so that given any particular stimulus, one intent on breaking into the system can determine the appropriate password from the table.

Another approach to break into such systems is known as the "cypher text attack." This approach is appropriate when the response or password results from a known or predictable stimulus. An analysis of the relationship between the stimulus and the response using standard cryptographic analysis techniques allows passwords appropriate to the future to be predicted.

Still a further approach or attack applicable to time dependent devices is time compression. This is accomplished by speeding up the clock to generate passwords appropriate to the future so as to more rapidly build a table for one of the other types of attack. Accordingly, when the future time arrives, the password is known and used to break into the system.

SUMMARY OF THE INVENTION

The present invention is embodied in a device that is analogous to a key in that it is a small portable device that can be conveniently carried by the user and that can be employed to obtain access to computers and software and for secure communications. The key contains solid state or semiconductor electronic elements that can execute a prescribed algorithm or one of a plurality of prescribed algorithms to produce a code which the computer receives and affords access to the computer, computer software, or provides secure communications if the code is correct.

A semiconductor key embodying the present invention includes a timer or clock which produces a series of pulses at a repetition rate corresponding to the elapse of real time. In the specific embodiments described hereinafter in more detail, the timer produces one pulse per day. The timer pulse changes the contents of a shift register, the output of the shift register being a predetermined function of the calendar date. The device includes a character output display of a password which is a function of the previously mentioned function. When the user inputs the displayed password to a computer, computer program or secure communications system to practice the invention, the computer affords access if the password is correct and/or has a prescribed relationship to a number generated within the computer.

In order for the software in the computer to be able to produce an internal password for comparison with the user input password, the user is first prompted by the computer to enter at least initially the current date. Most computers are presently configured with self-controlled battery operated clock cards which maintain the current date whether or not power to the system is maintained. The computer manipulates the current date by an algorithm corresponding to that in the key to produce the internal password.

An important aspect of the invention is that the shift register within the key is pre-loaded at manufacturing time with a unique number or numbers so that the likelihood of two keys being the same unique numbers is insignificant. For example, if the size of the shift register in the key is 32 bits, a size easily achievable under the present state of the art, there are almost five billion bit combinations that can be produced. Because the key is active, i.e., because a continuous supply of power is necessary to maintain the register state, disassembly of the key for the purposes of ascertaining the function is virtually impossible, because in disassembly it is highly likely that power to the shift register would be interrupted.

An enhanced version of a software access key embodying the invention, which is even more difficult for unauthorized persons to decode, involves an extra step to produce a password for input by the user. As in the version to which reference has been previously made, the key contains a shift register whose state changes with elapsed real time. The computer with which the key is adapted to cooperate is coded to generate a stimulus number which can be randomly generated and which is saved within the host computer. The stimulus number is transmitted to the key without direct connection. One technique for so transmitting the stimulus number involves excitation of one or more predetermined sites on the video display of the host computer and providing in the key one or more photo-sensors which respond to the pattern of excitation of the sites. The key includes circuitry for decoding the pattern of excitation at the display sites and generating a password from a combination of the decoded signal and the output of the above mentioned register that changes with real time. In practicing the invention employing the enhanced version, the association between the password displayed to the user and the current date as manifested by the output of the timer within the key is even more tenuous and therefore more difficult, if not impossible, to display by reverse engineering.

A further improvement to the above enhanced version includes the use of a keypad into which the access key can be placed. The keypad can be used with a computer system that does not have a video display or has one which will not properly excite the sensors on the access key itself. The keypad includes key switches and excitation device such as light-emitting diodes which can be placed in juxtaposition to the sensors of the access key. The computer display or printer or other output device displays an appropriate alphanumeric code which is then entered into the keypad. The keypad in turn excites the sensors on the key in order to transfer the stimulus.

In a further aspect of the invention for access management, software protection and secured communications, the key can have what is known as a forward algorithm and the host computer can have what is known as an algorithm which is inverse to the forward algorithm. An inverse algorithm is sometimes referred to as a reverse algorithm. In such an arrangement each key can be provided with an individually personalized root which is encrypted into a password by the forward algorithm. The encrypted password is then provided to the inverse algorithm of the host computer where the original root is recalculated. This original root can be used for comparison with a root stored within a computer for allowing access to the computer or to the software. Alternatively, in the case where the root is not stored within the host computer, the calculated root can be used as part of the puzzle to decrypt previously encrypted software. The forward and inverse algorithm modules of the invention can in fact contain a plurality of algorithms which can be selected depending on the passage of time or depending on yet another algorithm. The another algorithm can be contained in a further module and is often times referred as a seed module. This seed algorithm can provide output which is also time dependent. Through the use of one or two time dependent algorithms, possibilities of the system becoming susceptible to any of the attacks previously described is minimal to non-existent. The reason for decreased susceptibility to attack is that there is not enough time to build an adequate table before the algorithm changes.

Yet another practical way to reduce drastically the odds that the system can be broken is to increase the minimum of possibilities for the stimulus number.

In yet another aspect of the invention, in a secured environment, a root is selected and the appropriate software is encrypted using the root as part of the encryption. The encrypted software is then stored in the computer. The root is placed in the appropriate personalized key. The key is then used to access the software in the computer by transferring the root from the key to a decryption module in the computer where the root is used as part of a puzzle to decrypt the software so that the software can be used.

This same approach is used for sending and receiving encrypted data, computer programs and the like. Further, the key itself can be used to transport valuable data. This is implemented by using the valuable data as the root itself. The host computer then uses the password obtained from the access key to recalculate the root and obtain the valuable data. As the root in the access key will be destroyed should any attempt be made to disassemble the key, the root is highly secure.

An object of the invention is to provide a hardware device that must be employed to gain access to computers and software and for secure communications. This object is achieved by producing and displaying a password which must be input by the user and by arranging the circuitry in the key so that it produces, each time the device is used, a different password in accordance with an algorithm that is virtually impossible to predict.

Another object of the invention is to provide a device of the type described above that is inexpensive, portable and longlasting. The advent of large scale integrated circuit technology, such as manifested in existent wristwatches and the like, permits a key in accordance with the invention to be produced at a moderate cost, particularly when compared to the cost of many software programs.

A feature and advantage of the invention is that it employs digital techniques which afford exponential expansion of the number of possible combinations by merely extending by one or more bits the size of the numbers that the apparatus employs in producing a password.

The foregoing, together with other objects, features and advantages, will be more apparent after referring to the following specification and the accompanying drawings.

BRIEF DESCRIPTION OF THE DRAWINGS

FIG. 5 is a table showing logical states at various points in the circuit of FIG. 4 during a typical operating sequence.

FIG. 15 depicts a block diagram of the key pad of the invention.

FIG. 16 depicts patterns of optical signals of the invention.

DETAILED DESCRIPTION OF THE PREFERRED EMBODIMENTS

Figure 1:
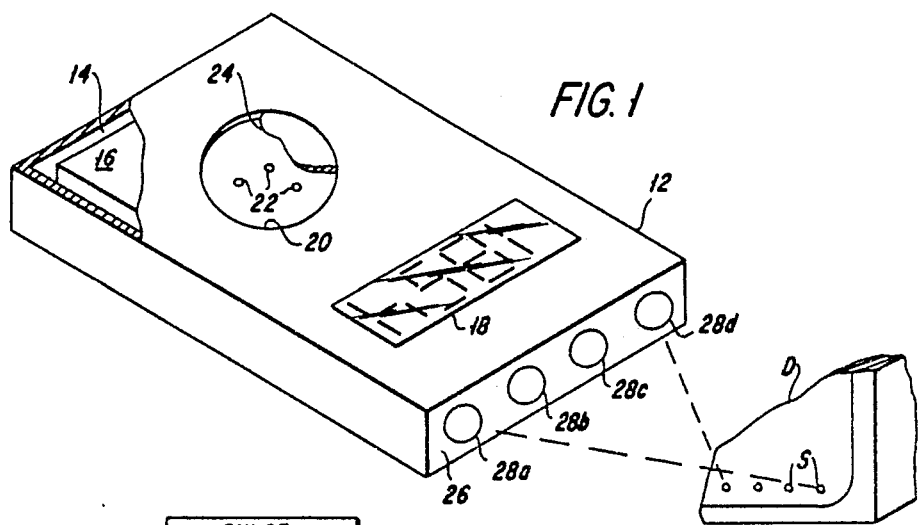
FIG. 1 is a perspective view of a computer access key embodying the invention with portions being broken away to reveal internal details.

Referring more particularly to the drawings, reference numeral 12 indicates a key embodying the present invention. The key includes a housing of plastic or like imperforate material which is hollow so as to define a central cavity 14. Within cavity 14 are elements, such as an integrated circuit device indicated fragmentarily at 16. Accessible from the exterior of the imperforate housing is a display 18 formed of conventional numeric or alphanumeric display elements, there being four numeric display elements in the embodiment shown in FIG. 1. Such elements are typically liquid crystal display or LCD elements. In the specific example seen in FIG. 1, display 18 displays the password or a displayed character representation "1854."

The top surface of key 12 is formed with a circular recess 20. The bottom surface of the recess contains one or more contact points 22, or openings in alignment with contact points within cavity 14, for establishing electrical contact with the circuitry 16 within the key. The contact points are employed when the key is set or initialized during manufacture to load a code or bit pattern that is unique to each user. After the key has been so set, a disk-shaped cover 24 is installed in recess 20 to insulate contacts 22. Disk-shaped cover 24 can be an adhesive-backed label having an outer surface containing trademark or product identifying information.

Key 12 has a front face 26. Mounted within face 26 and accessible from the exterior of key are sensors 28a, 28b, 28c and 28d. In the specific embodiment shown in the drawings, sensors 28a-28d are photoelectric diodes which respond to images formed on the video display screen D of the computer system containing software to which access is to be had. A fragment of video display screen D is shown at reduced scale in FIG. 1. As will be described subsequently, predetermined sites S on the screen are excited in an appropriate time-space pattern to produce a signal that is received by key 12 by way of sensors 28a-28d. The sensors and the sites on the computer video display exemplify an information transmission link that uses radiant energy and not direct connection between the key and the computer. Other useful forms of radiant energy are sonic energy or radio frequency energy.

As will be described hereinbelow with respect to FIGS. 14 and 15, in the situation where the computer system does not have a video screen, but has for example, a printer output or LCD or LED output, a keypad with sensors cannot be used in the way contemplated by the present embodiment. In that situation an access key can be inserted into the keypad with the appropriate stimulus from the computer entered into the keypad and simultaneously communicated through the light-emitting diodes of the keypad.

Figure 2:
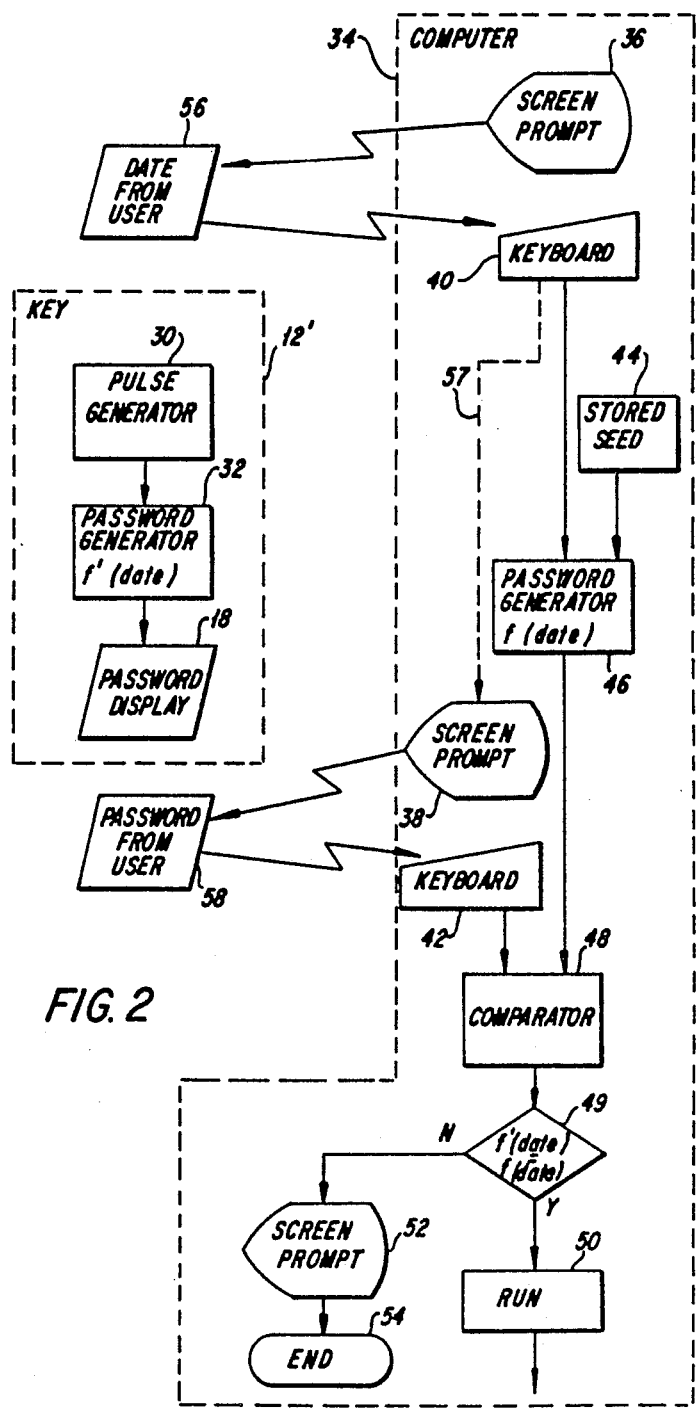
FIG. 2 is a block diagram showing the interaction between a relatively uncomplex key in accordance with the invention and a computer containing code in accordance with the invention.

Referring to FIG. 2, there is a key 12' which is somewhat less complex than that shown in FIG. 1 in that key 12' is not equipped with sensors 28a-28d Key 12' includes a crystal-controlled pulse generator or clock 30 that produces a series of timing pulses that count real time. In one device designed in accordance with the invention, pulse generator 30 produces one pulse per day. The timing pulses supplied by pulse generator 30 are coupled to a password generator 32. The password generator produces a unique combination of binary digits depending on the number of date pulses that have been supplied to it by pulse generator 30 since initialization. Thus the binary bit pattern produced by password generator 32 is a function of the current date, referred to in this description and in FIG. 1 as f'(date).

As will be described in more detail hereinafter in connection with the embodiment of FIGS. 3 and 4, password generator 32 can be embodied in a shift register into which pulses from pulse generator 30 are introduced serially and which produces a bit pattern representing f'(date) at parallel outputs. The specific number of bits produced by the password generator depends more on the number of keys that are to be distributed than circuit capabilities. Because the active components of key 12' are formed of large-scale integrated circuits, a virtually unlimited number of bits can be provided in a very small volume.

At least some of the parallel outputs of password generator 32 are connected to a password display 18 which, in one device designed in accordance with the invention, is constituted by a plurality of LCDs. In order to limit the number of digits that a user must input to the computer containing the software to which access is desired, fewer bits are displayed by display 18 than are produced by password generator 32.

It will be seen then that key 12' produces on display 18 a number f'(date) that is a function of the date. In order to render the key immune to reverse engineering or decoding by a persistent hacker, it is preferred that the function f'(date) be such that the relation between the number of date pulses coupled to password generator 32 and the bit pattern output by the password generator not be an inverse relation. In order to facilitate understanding of password generation, the computer and the program resident therein will be described.

Reference numeral 34 indicates a computer containing a software program. Access is sought to either or both of the computer and the program. The computer can be mainframe, mini or micro and includes a video display screen (or other output device or display such as a printer, LED or LCD display) on which user prompts, indicated at 36 and 38, can be displayed. The computer also includes a keyboard to afford user input, indicated schematically at 40 and 42. Other input devices such as touch screens, mice, etc. can be used.

Computer 34 contains a stored seed number schematically represented at 44. The value of the stored seed is representative of the number or state to which password generator 32 in the key has been initialized. The value of the stored seed uniquely associates the key and the software program resident in computer 34. The computer also includes code for executing a password-generating algorithm, which is the same as or similar to an algorithm used by password generator 32 indicated diagrammatically at 46. Thus the computer can produce, from the combination of the current date input by the user to keyboard 40 and stored seed 44, a password f(date) which corresponds to the password produced in key 12' and displayed on display 18. Also within computer 34 is comparison logic indicated at 48 for comparing the password generated by password generator 46 and the password input by the user to keyboard 42. Decision logic 49 determines subsequent action depending on whether correspondence between f(date) and f'(date) exists. Correspondence between the two passwords causes the protected software to run, indicated schematically at 50; inequality results in a screen prompt or message to the user, indicated at 52, and termination of the attempted access to the program, indicated at 54.

Figure 7:
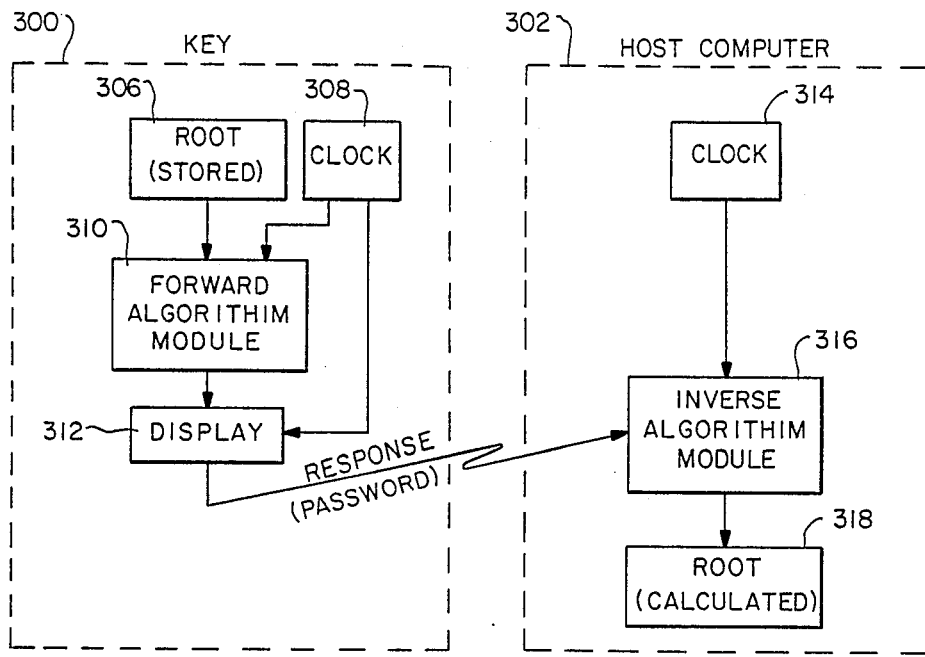
FIG. 7 is a block diagram of another embodiment of the access key and access verification system of the invention which uses forward and inverse algorithms.

Equality between the functions f(date) and f'(date) is but one example of a predetermined or prescribed relationship between the functions. Another exemplary relationship involves using f(date) as an encryption key and f'(date) as a decryption key. Yet another exemplary relationship includes forward and inverse algorithm as depicted in FIG. 7 described hereinbelow.

The operation of the system described to this point requires the user to activate computer 34 so that the video display requests the user, via screen prompt 36, to input the current date to the computer. Alternatively, of course, the date function can be automatically maintained by the computer. The user's compliance with the screen prompt is schematically indicated at 56, and the date is typed into the computer via keyboard 40. The date supplied to keyboard 40 is coupled to password generator 46 which, as alluded to previously, produces a password that is a function, f(date), of the current date. Such password is applied as one input to comparator 48. Another consequence of a date in proper form being applied to the keyboard is that the computer produces, via a control path 57, a second screen prompt, indicated at 38, which instructs the user to input the user's password. The password is produced by key 12' and displayed on display 18. The user's input of the password gleaned from display 18 is indicated schematically at 58, the password being typed into the computer keyboard at 42. The password so typed in by the user is supplied as another input to comparator 48. The comparator 48 supplies signal to decision logic 49, and if the password f(date) generated within the computer by password generator 46 corresponds to the password f'(date) input at keyboard 42, the software program is caused to run as at 50; that is, the user is afforded access to the software program. If the comparison fails, decision logic 49 causes creation of a screen prompt indicated at 52 informing the user that access to the computer software is denied.

Numerous characteristics of the present invention make it difficult, if not impossible, to decode by reverse engineering or other techniques. The number stored in password generator 32 is stored in a dynamic shift register so that attempted disassembly of the key, which would almost inevitably entail interruption of battery power to the shift register, will destroy the number or state within password generator 32. Because the relation, f'(date), between the date and the password displayed by display 18 is not an inverse function, a person obtaining possession of key 12' cannot derive the function f'(date) from observing a sequence of passwords displayed on display 18. Within computer 34, even the most readily copyable medium, a diskette, cannot be conveniently employed to decode the seed or the function f'(date). Such is the case because the seed can be embedded in data or code within the diskette at a different location from the logic that is called to effect password generation in response to keyboard input of the current date. Thus a significant degree of security is afforded.

Figure 3:
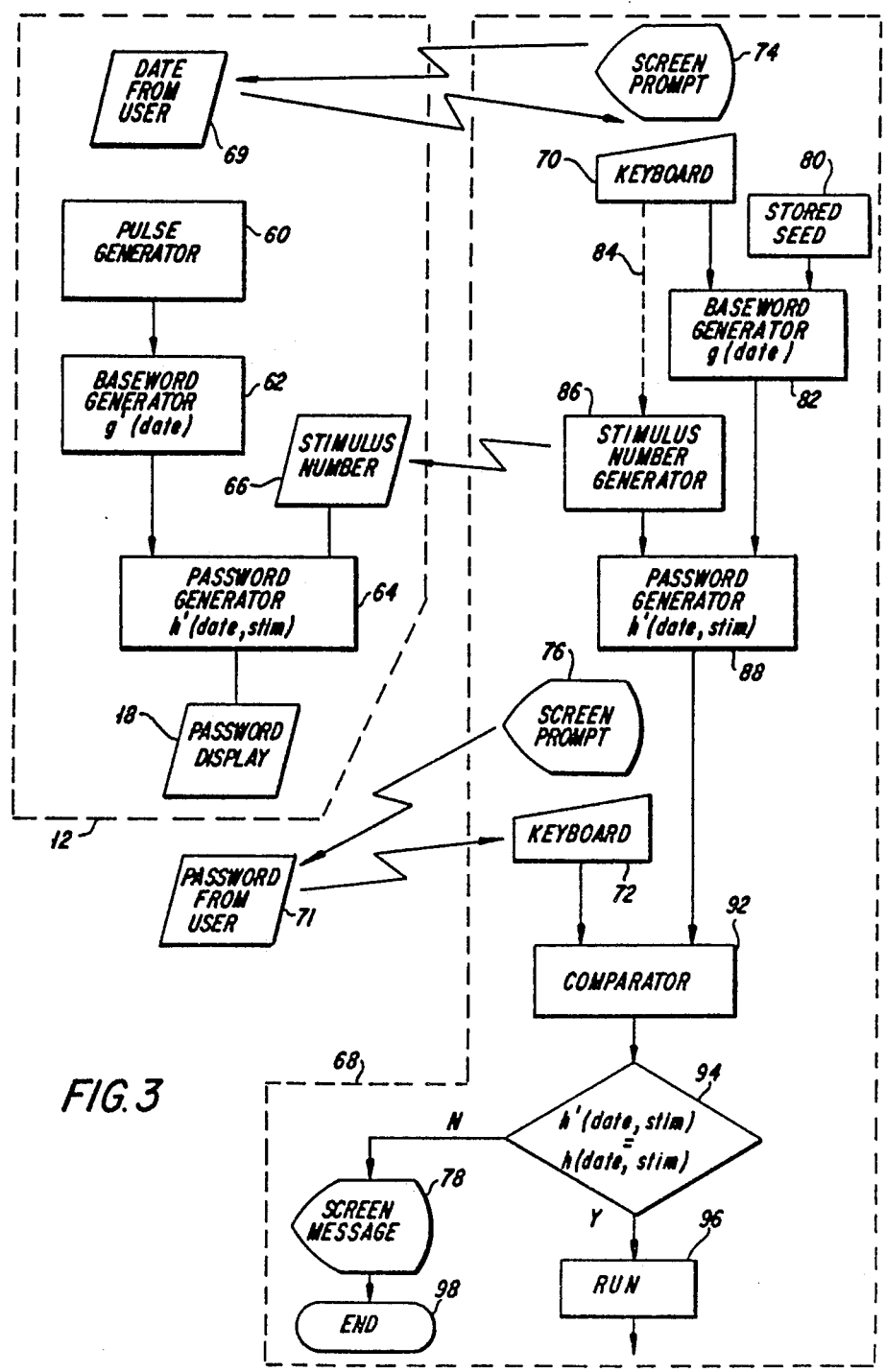
FIG. 3 is a block diagram similar to FIG. 2 but showing an enhanced key according to the invention.
Figure 4:
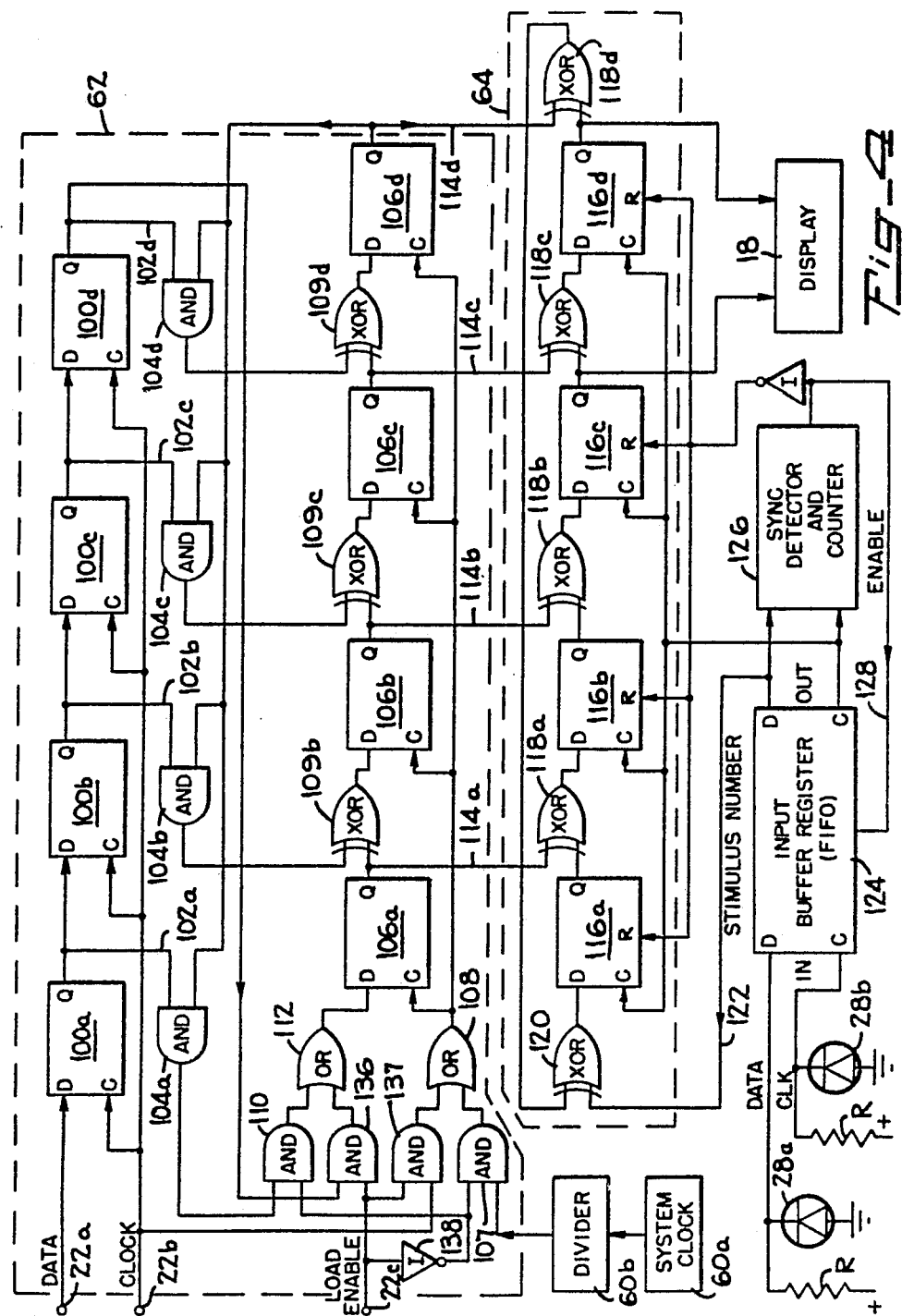
FIG. 4 is a block diagram of exemplary circuitry within the key of FIG. 3.

The embodiment shown in FIGS. 3 and 4 exploits sensors 28a-28d to afford a key having even greater immunity to unauthorized decoding or reverse engineering. Referring to FIG. 3, key 12 includes a pulse generator or clock 60 which is substantially identical to pulse generator 30 described above in connection with FIG. 2 in that pulse generator 60 produces pulses at a rate depending on the elapse of real time, for example one pulse per day. The output of pulse generator 60 is coupled to a baseword generator 62. Baseword generator 62 is similar in many respects to password generator 32 described in connection with FIG. 2. Baseword generator 62 is typically embodied in a shift register having a serial input and plural parallel outputs. Pulses from pulse generator 60 are coupled to the serial input and the combination of the bit states at parallel output forms a number that is a function, g'(date), of elapsed time, i.e., the total number of pulses that have been produced by pulse generator 60 since initialization. Baseword generator 62 is initialized at the time of manufacture with a unique bit pattern; because the baseword generator is typically embodied in a silicon chip, the possible number of unique bit patterns is virtually unlimited. The parallel outputs of baseword generator 62 are coupled as one input to a password generator 64. The other input of password generator 64 is supplied from a stimulus number input 66 via sensors 28a-28d. Password generator 64 produces an output that is a function of both the baseword, in turn a function of the date, and the stimulus number, such function being referred to herein as h'(date, stim), "stim" being an abbreviation for stimulus number. The output of password generator 64 is a plurality of bit states in parallel, and selected ones of the bits are made accessible to the user via display 18 to which the password generator output is coupled.

Key 12 is adapted for use with a computer system 68 which is similar to that described above in connection with FIG. 2. Computer 68 also contains software capable of executing an algorithm somewhat different from that described previously. Computer 68 has an input device such as a keyboard; the user of the key supplies to the computer from the keyboard the current date as indicated at 69 and 70 and the password as indicated at 71 and 72. Computer 68 also has a display screen D (FIG. 1), such as a video display, for prompting the user, screen prompts being illustrated in FIG. 3 at 74, 76 and 78. The computer or the program loaded thereinto has a stored seed, indicated at 80, which is uniquely associated with the state at which baseword generator is initialized at manufacturing time so that key 12 and the medium in which the stored seed exists are uniquely associated throughout the useful life of the apparatus.

Computer 68 also includes software code so that the computer can function as a baseword generator 82 and produce a baseword that is a function, g(date) of both the date input by the user to keyboard 70 and the stored seed 80. The output of baseword generator 62 in key 12 and the output of baseword generator 82 in computer 68 bear a prescribed relationship to one another, typically equality. There is a control path 84 from keyboard 70 to a stimulus number generator 86 so that when the user inputs a date to keyboard 70, stimulus number generator 86 is activated to produce an output which can be a random or arbitrarily varying number. The stimulus number produced by stimulus number generator 86 is utilized in two ways. First the stimulus number is saved as one input to a password generator 88. Second the stimulus number is processed by the computer to produce a time-space pattern on screen sites S for transmission of information that can be sensed by sensors 28a–28d. The user can place key 12 adjacent the computer display such that sensors 28a–28d are excited by radiation from the screen sites so that a signal representative of the output of stimulus number generator 86 is applied to password generator 64 in the key.

Password generator 88 produces a function h(date, stim) which bears a prescribed relationship to the password produced by password generator 64, equality being the typical relationship. The password displayed on display 18 is input to computer 68, element 71 representing the user's input and element 72 representing reception at the computer keyboard of the password. The password input by the user and the password generated by password generator 88 are compared by the computer which is coded so as to form a comparator 92. There is decision logic 94 within computer 68, and if correspondence between the computer generated password and the user input password is detected, the software program to which access is to be controlled is run as indicated at 96. If, to the contrary, lack of correspondence between the two passwords is detected, a screen message is produced, as indicated at 78, and access to the software program is denied, indicated at 98.

In further explanation of the construction of key 12, reference is made to FIG. 4. In FIG. 4 discrete logical elements are shown solely for the purpose of illustration, because the preferred embodiment of the invention incorporates the circuit functions within one or more silicon chips. FIG. 4 depicts an algorithm which can be used to produce the password. Quite naturally other similar algorithms and pluralities of such algorithms can be used.

In FIG. 4, at the upper portion thereof, are four data type flip-flops 100a, 100b, 100c and 100d. The flip-flops form a shift register having four outputs identified at 102a, 102b, 102c and 102d. The state of the flip-flops 100a–100d and therefore the bit pattern appearing at outputs 102a–102d, remains constant throughout the life of the key, and after initialization uniquely identifies a single user. Although four flip-flops provide only sixteen combinations of unique numbers or functions, it is reiterated that FIG. 4 is for the purpose of illustration and is not for the purpose of limitation.

As will appear, the state of flip-flops 100a–100d defines the function g' referred to previously in connection with element 62 of FIG. 3 to which the timing pulses from pulse generator 60 are subjected to produce the baseword g'(date). Parallel outputs 102a–102d are connected as inputs to respective AND gates 104a 104b, 104c and 104d.

The outputs of AND gates 104a–104d are gated to the input of respective data type flip-flops 106a, 106b; 106c and 106d. Flip-flops 106a–106d have clock inputs to which the output of pulse generator or clock 60 is coupled; in FIG. 4 pulse generator or clock 60 is shown as a crystal-controlled oscillator that constitutes a system clock 60a which produces system clock pulses at a relatively high rate and a divider circuit 60b which divides the relatively high frequency pulses produced by the system clock so that the output of the divide circuit provides a pulse at a repetition rate of one per day. Divide circuit 60b is coupled to the clock inputs of flip-flops 106a–106d through an AND gate 107 and an OR gate 108. Each AND gate 104a–104d includes a second input to which is coupled the Q output of flip-flop 106d. The outputs of AND gates 104a–104d thus depend on the state of flip-flop 106d and the states of respective flip-flops 100a–100d. The D inputs of flip-flops 106b–106d are supplied through respective XOR gates 109b, 109c and 109d which have one input coupled to respective AND gates 104b–104d and another input coupled to the output of the preceding flip-flop, namely: 106a–106c, respectively. The input to flip-flop 106a is supplied by AND gate 104a through AND gate 110 and an OR gate 112. After initialization during manufacture, AND gate 110 is continuously enabled so that during the life of key 12, operation occurs as though AND gate 104a were directly connected to the D input of flip-flop 106a.

Flip-flops 100a–100d together with AND gates 104a–104d and XOR gates 109b–109d cooperate to produce the function g'(date). Thus flip-flops 106a–106d have respective outputs 114a–114d, the bit pattern of which corresponds to the baseword, g'(date). As such the bit pattern appearing on outputs 114a–114d changes once each day to a number that is the function of the number of pulses supplied by divider circuit 60b and the state stored in flip-flops 100a–100d.

The baseword is coupled to a password generator 64 which includes data type flip-flops 116a, 116b, 116c and 116d. There are four XOR gates 118a, 118b 118c and 118d, each of which has one input driven by the respective Q outputs of flip-flops 106a–106d and the other input driven by respective flip-flops 116a–116d. The output of XOR gate 118a is coupled to the D input of flip-flop 116b the output of XOR gate 118b is coupled to the D input of flip-flop 116c, the output of XOR gate 118c is coupled to the D input of flip-flop 116d and the output of XOR gate 118d is coupled to the D input of flip-flop 116a through an XOR gate 120. To the other input of XOR gate 120 via a circuit path 122 is coupled the stimulus number received by sensors 28a–28d and indicated in FIG. 3 at 66.

Two sensors, such as sensor 28a and 28d, are shown in FIG. 4. The other two sensors, 28b and 28c, are omitted for simplicity because their outputs are handled in substantially the same manner as is the output of sensor 28a. The sensors are biased by pull-up resistors R which are connected to the positive terminal of the battery power supply within key 12. The outputs of the sensors constitute inputs to an input buffer register 124. Buffer register 124 is a FIFO register. The register has a plurality of data inputs, one of which is shown coupled to the output of sensor 28a, and a clock input shown coupled to the output of sensor 28b. The buffer register has a Q output, on which data appears, and a clock output. The data and clock outputs of input register 124 are coupled to a sync detector and counter 126. Sync detector 126 is a well-known circuit which detects a prescribed pattern and number of signals supplied to it from buffer register 124 to ascertain when a data signal, in contrast to noise or the like, has been applied to the sensors. When ascertainment of data signals is made, a sync detector supplies, via a circuit path 128, an enable signal to input register 124. In response to receipt of an enable signal, the input register supplies data to XOR gate 120 via circuit path 122. Sync detector and counter 126 includes a counter which counts a prescribed number of pulses (four in the exemplary circuit of FIG. 4) and applies an enable signal on circuit path 128 for a period corresponding to the duration of the prescribed number of pulses. There is an inverter 129 coupled from circuit path 128 to the reset inputs of flip-flops 116a–116d. When there is no enable signal on circuit path 128, the action of inverter 129 is such as to reset flip-flops 116a–116d so that the state of their respective outputs is 0. When a stimulus number of proper format is received, the enable signal is asserted and the reset signal to flip-flops 116a–116d is discontinued so that the stimulus number can be loaded into the shift register constituted by the latter flip-flops.

The bits appearing at the outputs of flip-flops 116c and 116d are displayed to the user on display 18. Because FIG. 4 has been reduced and simplified for the purposes of clarity of description, the output of only two of the flip-flops that constitute a part of password generator 64 are employed. In actual practice, as has been stated previously, more than two bits are employed and more than one digit is displayed on display 18.

Before summarizing the operation of the circuit of FIG. 4, initialization of the circuit will be described. Initialization occurs either at the time of manufacture or at some subsequent time when the key is to be introduced into commerce in combination with a specific computer software program to which access is to be limited. In the embodiment shown in FIG. 4, there are three inputs to which connection is necessary for initialization. Such inputs have been previously identified in connection with FIG. 1 as contact points 22. One initialization input 22a, a data input, is coupled directly to the D input of flip-flop 100a. A second initialization input 22b, a clock input, is coupled to the clock inputs of flip-flops 106a–106d through a gating circuit. A third initialization input 22c, a load enable input, is directly coupled to one input of each of two AND gates 136 and 137 and is coupled through an inverter 138 to one input of each of two AND gates 107 and 110. The other input of AND gate 136 is coupled to the Q output of flip-flop 100d. The other input of AND gate 137 is coupled to clock input 22b. The outputs of AND gates 110 and 136 constitute the inputs to OR gate 112. During initialization only AND gates 136 and 137 are active because the load enable signal applied to initialization input 22c and inverted by inverter 138, disables AND gates 107 and 110.

In order to initialize the key, that is, to load into the shift register formed by flip-flops 100a–100d a permanent, unique number, an enable signal is first applied to load enable input 22c. The enable signal is a voltage level that corresponds to a logical 1. A serial bit pattern is then applied to data input 22a and a clock pulse signal, at a rate substantially in excess of that produced by divider circuit 60b, is applied to clock input 22c until flip-flops 100a–100d are loaded with the desired permanent bit pattern and flip-flops 106a–106d are loaded with an initial bit pattern. Thereafter connections to initialization inputs 22a, 22b and 22c are broken and the key is ready for use. Operation of key 12 will be described by using an example in which the bit pattern loaded into flip-flops 100a–100s is 0101, and the bit pattern initially loaded into flip-flops 106a–106d is 1100. Because flip-flops 116a–116d are reset prior to each introduction of a stimulus number, their respective Q outputs are set to a logical 0 state.

The output of password generator 64 is constituted by the outputs of flip-flops 116c and 116d which are coupled to display 18. The outputs of all flip-flops constituting password generator 64 are defined by the following equations or algorithms:

$$Q_{116a}(t+1) = \text{stim}(t) \text{ XOR } (Q_{116d}(t) \text{ XOR } Q_{106d})$$
$$Q_{116b}(t+1) = Q_{116a}(t) \text{ XOR } Q_{106a}(t)$$
$$Q_{116c}(t+1) = Q_{116b}(t) \text{ XOR } Q_{106b}(t)$$
$$Q_{116d}(t+1) = Q_{116c}(t) \text{ XOR } Q_{106c}(t)$$

In the above formulas, Q(t) represents the state of the indicated parameter before a clock pulse is supplied by buffer register 124 to the flip-flops, the parameter Q(t+1) represents the state after such clock pulse, and the parameter stim represents the value of a bit in the stimulus number by sensors 28a–28d and processed by buffer register 124.

Referring to the table of FIG. 5, rows 140 show a typical number permanently stored in the shift register constituted by flip-flops 100a–100d. Rows 142 show the number stored in the shift register constituted by flip-flops 106a–106d immediately after initialization, i.e., during day 0 in the operating life of the key. Rows 144 show that upon reset, the output of password generator 64, constituted by flip-flops 116a–116d, is constituted by all logical 0s. The next group 146 of four rows shows the outputs of flip-flops 116a–116d as each digit of a stimulus number 1110 is detected by sensors 28a–28d, processed by buffer register 124, and supplied to password generator 64 via circuit path 122. Upon completion of processing of the stimulus number, display 18 displays a number representative of binary 11 and indicated at $18_1$.

Row group 148 shows the processing of a subsequent stimulus number, in this case 0100. The password displayed to the user by display 18 is representative of binary 10, indicated at $18_2$.

When a timing pulse is produced by system clock 60a and divider 60b, the output states of flip-flops 106a–106d are changed, the new states being a function of the prior states of those flip-flops and the number permanently stored in flop-flops 100a–100d. Rows 150 show the state of flip-flops 106a–106d at day 1. If during day 1 the user wishes to use the device and if a stimulus number 1111 is produced by the computer system and received by sensors 28a–28d, indicated at row group 152, display 18 will display a number representative of binary 11, indicated at 183 in FIG. 5.

The sequence of operation described above demonstrates that the password displayed to the user changes on a daily basis and changes for each stimulus number received from the computer system with which the device is used. Because the relation between the number permanently stored in flip-flops 100a–100d and the password characters displayed to the user is not an inverse relation, it is virtually impossible for even the legitimate possessor of the key to deduce the permanently stored number or the function or algorithm that is employed to generate the displayed password characters.

To afford further insight into the apparatus of FIGS. 3 and 4, the following pseudo code is presented to illustrate cooperation of a computer in which resides a program to which access is sought by a user and a key embodying the invention:

(1) Prompt user for date;
(2) Accept date from user;
(3A) Compute internal baseword from date and stored seed;
(3B) Generate stimulus number;
(3C) Transmit stimulus number to user and save stimulus number;
(3D) Compute internal password from internal baseword and saved stimulus number;
(4) Prompt user for password;
(5) Accept password from user;
(6) Compare user password and internal password;
(7) Initiate program execution if equal.

In the embodiment of the invention described in more detail in connection with FIG. 2, the steps identified above as 3A–3D are combined and simplified to produce apparatus that affords security against unauthorized access to a somewhat lesser degree than the embodiment of the invention shown in FIGS. 3 and 4.

Figure 6:
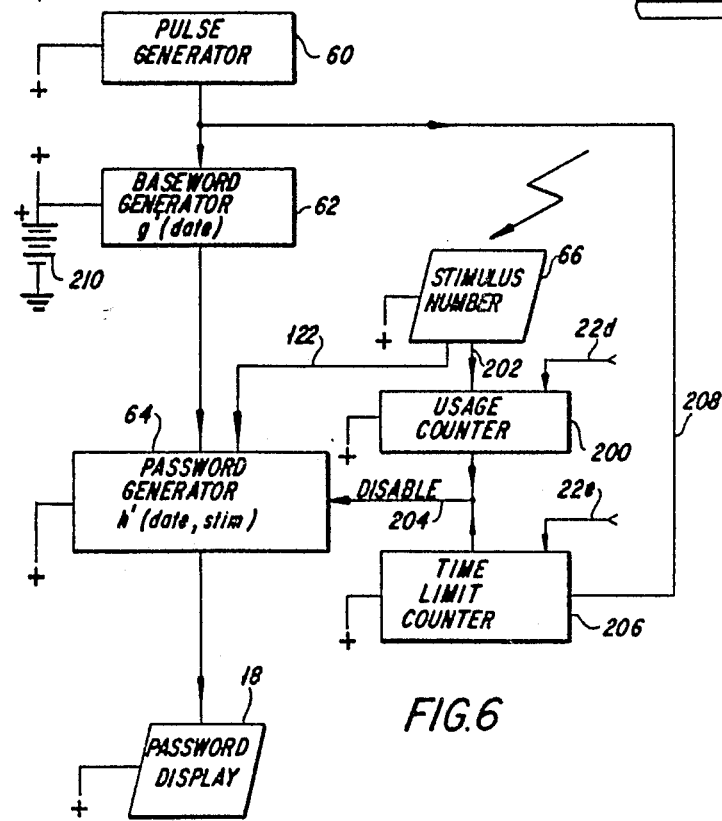
FIG. 6 is a block diagram f a key showing various enhancements in accordance with the invention.

The elements in FIG. 6 that are identical to similar elements in FIG. 3 bear identical reference numerals to those employed in FIG. 3. There is a pulse generator 60 which produces an output each day or like constant time interval. The timing pulse is coupled to baseword generator 62 where it is used as previously described. The baseword generated by baseword generator 62 is coupled to a password generator 64. Also coupled to password generator 64 is a stimulus number input from the video display via sensors 28a–28d, reception and processing of the stimulus number being indicated at 66. Password generator 64 produces a password that is displayed to the user on display 18 and the user inputs the password to the computer to obtain access to the protected software within the computer.

There are certain instances where the owner of software may desire to limit the usage made of the software. One form of limited usage is to permit the software user to access the software a specific number of times. To afford this mode of operation one enhancement in the device shown in FIG. 6 is a usage counter 200. The usage counter is typically loaded at initialization time with a number equal to the authorized number of uses of the software. Each time a stimulus number is received and processed, as at 66, a pulse is applied to the usage counter via a signal path 202 to decrement the counter. When the counter is ultimately decremented to 0, the counter produces a disable signal on a signal path 204. The disable signal is coupled to password generator 64 and when the disable signal occurs, password generator 64 is disabled. Usage counter has an initialization input 22d so that at the time of initialization, the number of times for authorized usage can be loaded into the counter. Input 22d is accessible from a contact point 22 (FIG. 1).

Another technique for limiting the usage of the software program is to place a time limit on the usage rather than a usage limit. For this purpose there is a time limit counter 206 which is loaded to some initial count indicating the number of days of authorized usage, there being an initialization input 22e for this purpose. A timing pulse from pulse generator 60 is supplied via a signal path 208 to time limit counter 206 each time a pulse is produced by pulse generator 60, e.g. one pulse per day. When the count stored in time limit counter 206 reaches 0, a disable signal is produced on signal path 204 which disables password generator 64 and prevents further access to the program.

In the interest of completeness, a power supply in the form of a battery 210 is shown in FIG. 6. Such battery is also provided for the key shown in the other figures, but it is not shown in the other figures in the interest of simplicity and clarity. Suffice it to say that the battery is connected to each of the elements within the circuit, the connections being indicated by an input lead having a plus sign, "+," adjacent the distal end thereof.

Thus it will be seen that the present invention provides a device that affords security against unauthorized access to computer software programs. Because the date represented by the cumulative number of pulses produced since initialization and the stimulus number are each modified according to one or more functions in producing a password visible to the user and because each function is not palpable, ascertainment of the password by reverse engineering or like analysis is so difficult as to be virtually impossible. The device is highly portable, convenient to use and relatively inexpensive to produce. In addition use of the device is convenient because no connection to or modification of the computer system is required.

Another embodiment of the invention can be seen in the block diagram representation of FIG. 7. In FIG. 7, the access key is enclosed by a dotted line and given the designation 300. The host computer 302 has resident therein an access key verification system 304 which is similar to that shown in FIGS. 2 and 3.

Access key 300 includes a root value stored in root module 306 which is uniquely characteristic of the key. The root can be an alphanumeric code, data of any nature, portions or all of a computer program, and other information which can be of great value in addition to a simple value such as a password. Root 306 can be stored in a register or other memory device as previously described.

Additionally, key 300 includes a clock 308 which is battery operated. The clock 308, as previously indicated, enables the key at all times to know the current time. This clock 308 is synchronized with the clock 314 of the host computer 302.

The key 300 further includes a password generator which in this embodiment is known as a forward algorithm module 310 for generating, encoding or enciphering a password based upon the inputs from the root 306 and the clock 308. This password can be communicated to the host computer 302 and in particular to the access key verification system 304 in order to accomplish the secure transfer of the information contained in the root 306.

It is to be understood that even though the embodiment of FIG. 7 does not depict I/O devices such as various displays, screens, printers, keyboards and the like as shown in FIGS. 2 and 3, it would be obvious for one of ordinary skill in the art to include these expediencies in the embodiment of FIG. 7 and the hereinbelow embodiments.

The forward algorithm module 310 includes an algorithm such as the algorithm embodied in FIG. 4. It is to be understood that there are various hardware and software methods for representing this algorithm both in the key 300 and in the host computer 302. The algorithm of forward algorithm module 310 is of a variety of which can be run both in the forward and the inverse or reverse direction.

At regular or random inputs from the clock 308, the algorithm changes so that the root 306 is encrypted or enciphered in a different manner such that the password produced thereby is not the same. It is to be understood that the forward algorithm module 310 can include a plurality of forward algorithms, any particular algorithm selected responsive to the various signals that can be set from the clock 308. For example, clock 308 could send a signal every second or minute changing the format of one particular algorithm of the plurality of algorithms. Clock 308 could then send a signal once every 24- or 72-hours for example, that signal causing a different one of the plurality of algorithms to be selected for encoding or enciphering the root responsive to the intermediate second or minute signals from the clock 308.

For the above functions, the clock 308 (and also clock 314) includes a date bit or bits which is communicated directly to display 312 and inverts at least one bit of the display. This inverted bit is communicated from the key to the host computer to inform the inverse algorithm module 316 that the algorithm format has been changed or that another algorithm has been selected. This date bit is checked against a similar bit from clock 314 to insure that the clocks are synchronized. This apparatus is tolerant so that the clocks 308, 314 can drift apart as much as one-half of the period (for example 24- or 72-hour period) and still allow the key 300 to access the computer and/or software. In this manner, greater security is afforded to the root 306.

Key 300 includes a display 312 which operates much in the way that the displays of FIGS. 2 and 3 operate. Display 312 however includes a mechanism for insuring that any password generated is displayed for a predetermined period of time. In a preferred embodiment, 24 seconds is selected.

The reasons for the various selections and intervals of time as indicated above is to foil and make practically impossible the building of attack tables to breakdown the algorithm that is encoding the root. As can be understood, if the algorithm is changed every 24 to 72 hours, then entire new tables must be built. Further, if the display requires that the password be presented for a fixed amount of time such as 24 seconds or a minute, there are only a certain number of passwords that can be coaxed out of the key in a given 24- to 72-hour period. Thus, even with sophisticated methods for breaking the key, there would simply not be enough time to generate enough passwords to understand the encoding algorithm.

A clear text attack is difficult to use on the changing family of algorithms because the time frame on which the algorithms change is relatively short and there is not sufficient time to build a table adequate enough to allow unauthorized intrusion into the system. In this preferred embodiment, in a 72-hour period only about one five hundredth of a table can be built before the algorithm changes. Thus, for example, in twenty-five such periods (72 hours) only twenty-five one-five-hundredth portions of tables can be built. This is not sufficient data to allow successful attack of the algorithms. The use of such algorithms that change with time means that a stimulus number of a more limited length can be used without making the system more susceptible to, for example, a table attack. Shorter stimulus numbers are easier and faster to use and input, and the system is accordingly more user friendly.

The access key verification system 304 includes a clock 314 which is synchronized to the clock 308 of the key 300. It is to be understood that presently the majority of computer systems have or have the capability of having an onboard battery-operated clock card which generates the correct time whether or not the computer is on and whether or not power is supplied to the main portions of the computer. Access key verification system 304 further includes an inverse algorithm module 316 which is similar to forward algorithm module 310 except that inverse algorithm module 316 includes a reverse or inverse algorithm for the algorithm stored in module 310. Thus with the input from the clock 314, which is the same as the input from the clock 308, the inverse algorithm module 316 can accept the password from the access key 300 by methods disclosed in FIGS. 2 and 3 above and generate or decipher or decrypt the root value which is then stored in calculated root module 318 for use by the host computer 302. Unlike other embodiments, the present embodiment does not have comparison means and does not store a value which is to be compared against the calculated root 318. In other words, the root is not known to the host computer 302 until the password from the access key 300 is entered.

As previously indicated, the key 300 can be used for the transportation of valuable data which is embodied in the root 306 and is not initially known by the host computer 302. Such information can include banking or securities data, highly confidential codes, keys to unlock and decipher software, keys for access to other systems or the software resident therein and other information. It is to be understood that as the key is battery-operated and as the information in the root module 306 is stored in volatile memory, any attempt to disassemble the key to obtain the valuable information in the root module would result in interruption of the battery power to the root module and destruction of the information as previously described with respect to the embodiments of FIGS. 2 and 3.

Figure 8:
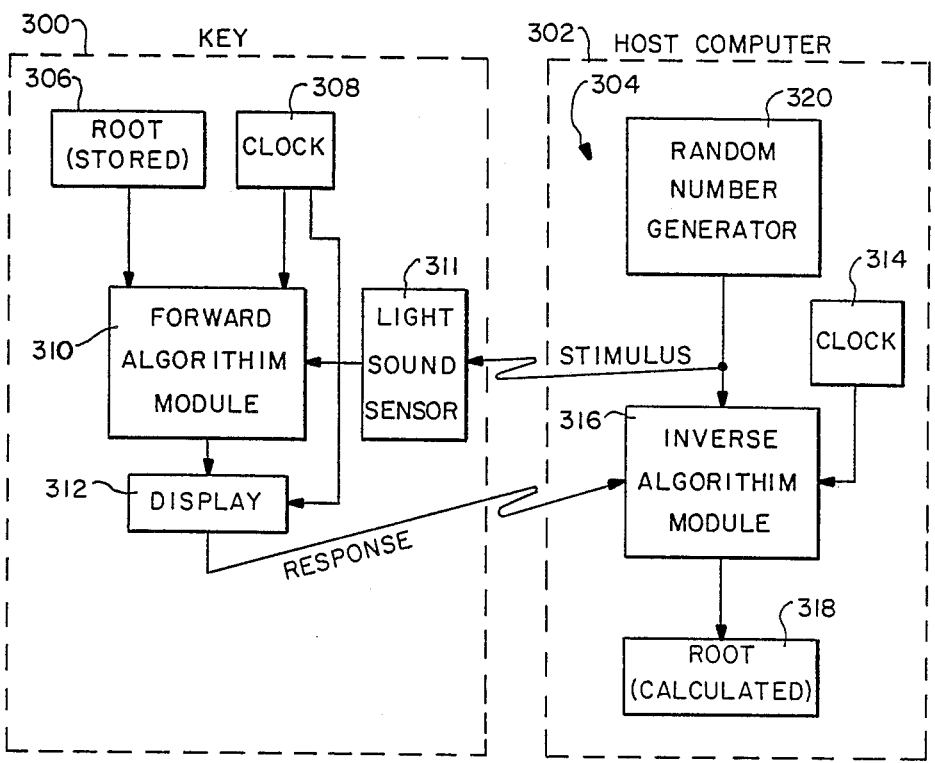
FIG. 8 depicts the invention of FIG. 7 with the enhancement of a stimulus number generator.

FIG. 8 depicts another embodiment of the present invention which includes many of the aspects of FIG. 7 which are similarly numbered and a stimulus number or random number generator 320 which is embodied in the key verification system 304 of the host computer 302. As with the embodiment of FIG. 3, the stimulus number generator 320 of FIG. 8 can generate a stimulus or a number which is also known as a challenge. This stimulus can be presented on the video display of the host computer 302 or can be presented on an alphanumeric display or on a printer output or on any of the various possible output devices which can be employed by the host computer 302. The stimulus can, as previously indicated, include a series of flashing lights which are intercepted by the sensors of the key as depicted in FIG. 1. The stimulus is provided to both the forward algorithm module 310 and the inverse algorithm module 316 and used first to encrypt or encipher the root through module 310 to produce the password and then to decrypt or decipher the password in inverse algorithm module 316 to produce the calculated root 318 which is identical to or has a known relationship to the stored root in root module 306.

It is to be understood that present silicon chip technology affords the capabilities of building such stimulus number generators with astronomical numbers of stimuli possibilities. In the present embodiment, the stimulus generator can produce as many as $2^{23}$ stimuli. Thus the possibilities of attacking the algorithm by building tables based on either the responses (or password) and/or the stimulus (or challenge) is infinitesimally small.

It is to be understood that the use of a system that combines the possibility of generating a large number of stimuli (such as $2^{23}$ possible stimuli) with the ability to change the algorithm after a period of time (such as 72 hours) and with the ability to limit the number of responses that can be generated (by requiring each response to be displayed for 24 seconds before another response can be determined and displayed) immeasurably decreases the possibility that such a system can be successfully attacked. It is to be understood that as described above, a successful system can include one or more of the above variations.

It is to be further understood that in addition to the light or electromagnetic wave sensors 28 of the access key shown in FIG. 1, the key such as key 300 in FIG. 8 can have a sound sensor for receiving, for example, a voice or computer sound generated stimulus. Thus it is evident that a number of biometric gates can be used to input a stimulus to the key.

Figure 9:
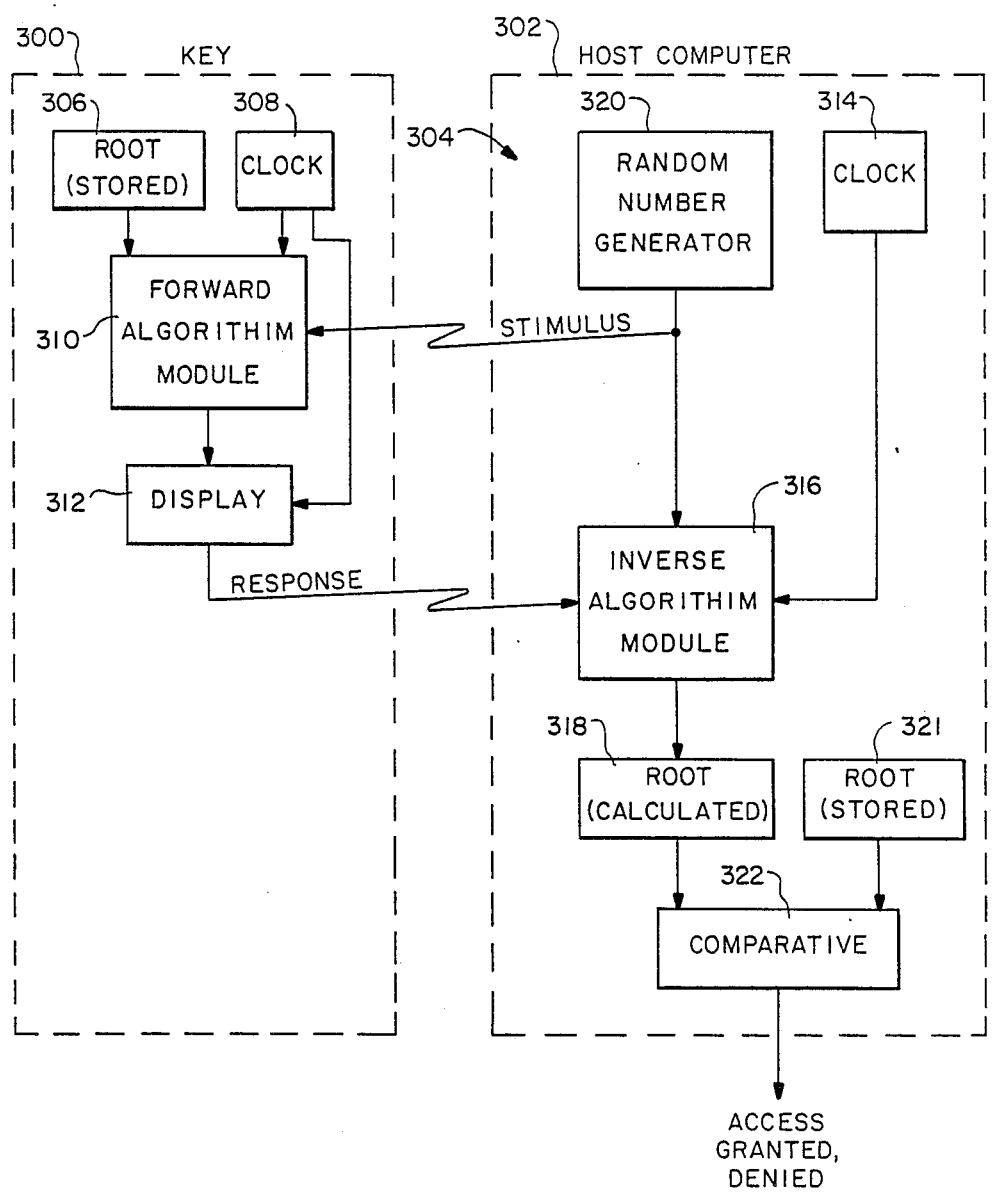
FIG. 9 depicts an enhanced version of the embodiment of FIG. 7 wherein a calculated root is compared with a stored root to allow access to a computer or software.

With respect to FIG. 9, the access key 300 and the key verification system 304 have elements similar to the access key and access key verification systems of FIGS. 7 and 8 and are similarly numbered. In addition, the embodiment of FIG. 9 includes a stored root module 321 which is the same as and stores the same information as the stored root module 306 of the access key 300. In this embodiment, the host computer knows the one or more roots which can be used to gain access to the computer and/or software resident in the computer. Unlike the embodiments of FIGS. 2 and 3, the root is not calculated by the use of, for example, the password generator 46 of FIG. 2, but is stored for use in comparison with the calculated root 318 provided by the inverse algorithm module 316. The calculated root 318 and the stored root 321 are provided to a comparator 322. Comparator 322 is similar to comparator 48 of FIG. 2, and it is to be understood that the access key verification system 304 includes the access grant/deny logic which is taught by FIGS. 2 and 3 above.

Figure 10:
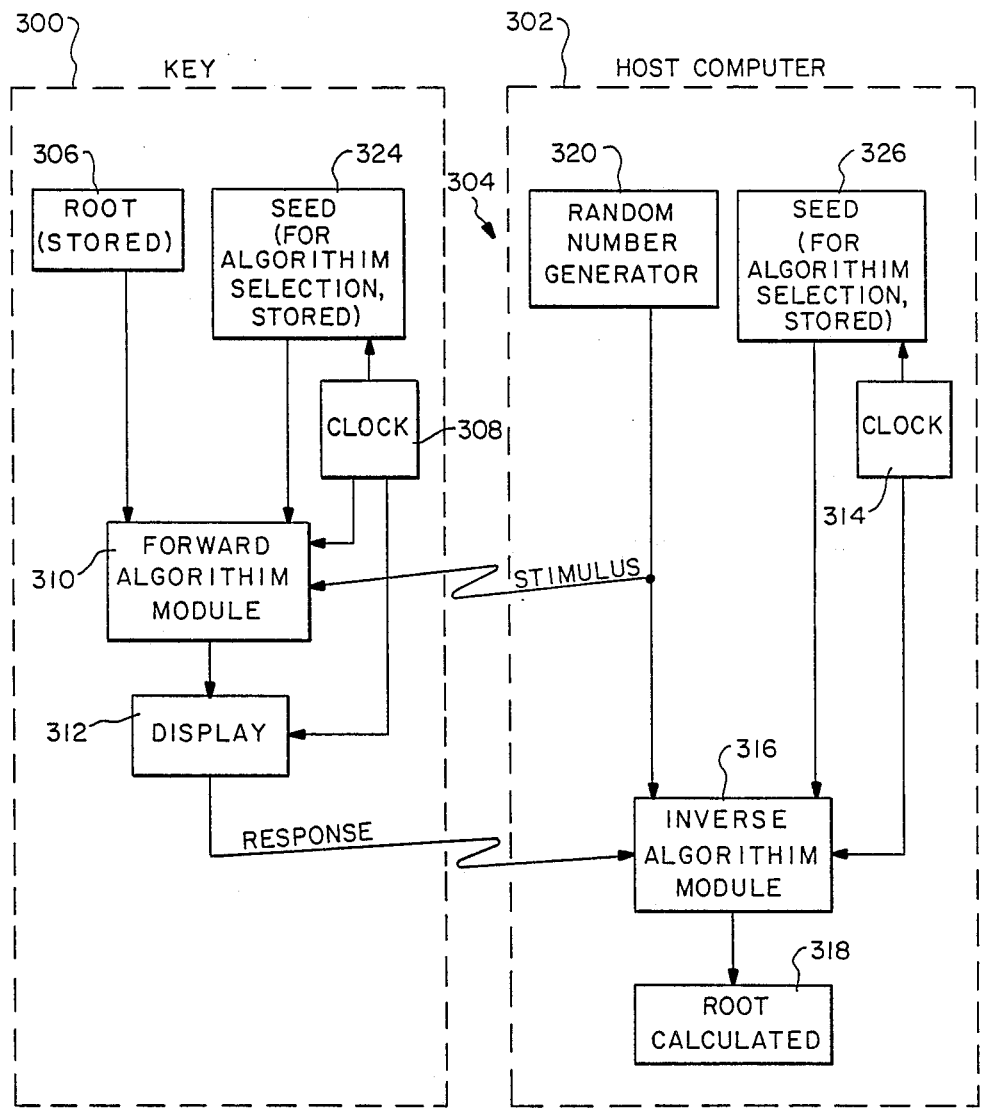
FIG. 10 depicts an enhanced version of the embodiment of FIG. 7 with the use of a seed or a second personality characteristic in addition to the root.

A further embodiment of the present invention is shown in FIG. 10. In this embodiment, elements such as those of the immediate precedent figures are similarly numbered. In addition, the embodiment of FIG. 10 includes a stored seed module 324 in access key 300 and a stored seed module 326 in access key verification system 304. Both of these modules can be run or communicated with the clocks 308 and 314 respectively. The store seed module 324 can include a single value stored on a memory device such as described as one of the many possibilities for the stored root. Additionally, the seed may be an algorithm much as the algorithm depicted in FIG. 4 which periodically generates a new value responsive to the input from the clock and communicates that new value to the respective algorithm modules. The seed can further be a plurality of algorithms which are selectively used to generate a value to communicate with the forward and reverse algorithm modules 310 and 316 much as a plurality of algorithms can be manipulated by the forward and inverse algorithm modules themselves as previously discussed.

The seed signal can vary also with each use. Thus at the end of each use, the seed sends a signal to the forward algorithm in order to select a new algorithm for encrypting the root.

Figure 11:
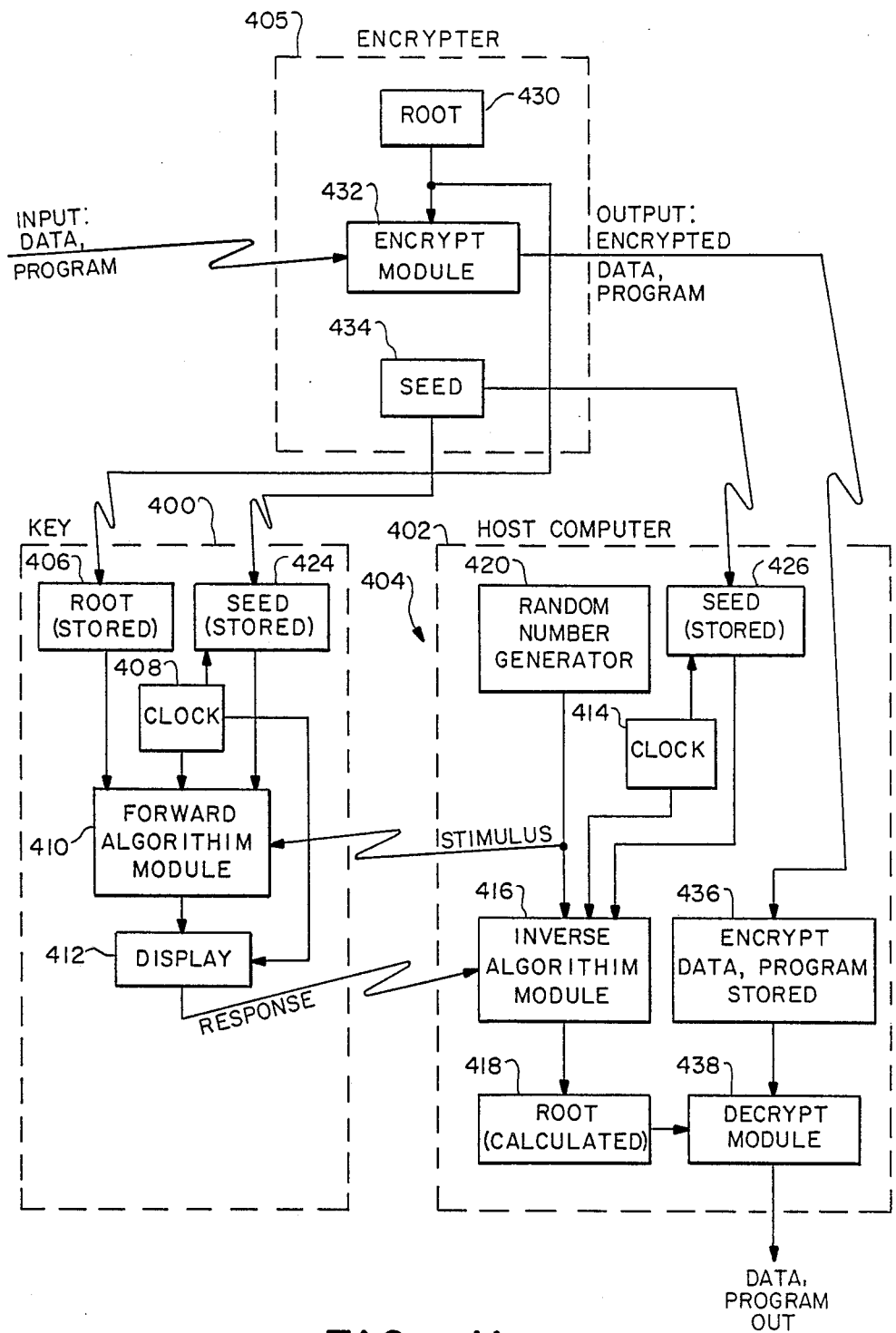
FIG. 11 depicts the block diagram of a system for encrypting and securing software including a software encrypter, the access key, and access key verification and decrypter system.

The next embodiment as shown in FIG. 11 depicts a copy-protect or lock system for encrypting, for example, data or valuable programs which can reside on floppy diskettes and other storage media.

The embodiment of FIG. 11 includes an access key 400, host computer 402, access key verification system 404, and a data and/or computer program encrypt or encypher system 405. Key 400 and key verification system 404 include many of the same elements which are presented in the past embodiments. These similar elements are given the same relative number in this 400 series numbering scheme. It is to be understood that while the present embodiment discloses the use of stored seed modules 424, 426 and stimulus number generator 420, that the embodiment of FIG. 11 can be made without such elements as is evident from the embodiment depicted in FIGS. 7 and 8.

The purpose of the present embodiment of FIG. 11 is to provide a lock for software such as software which is sold commercially and which is easily transportable on floppy disks and other forms of media. Essentially, the software or data to which the lock is to be applied is input to the encrypt system 405 which is located in a secure environment. The encrypt system 405 includes a root module 430 which can contain the same root which is stored in root module 406 and calculated and stored in root module 418. Additionally the encrypt system 405 includes an encryption module 432 which can use the input from the root to encrypt the data or program to be lock protected. It is to be understood that there are a variety of methods for so encrypting the data to be protected. One of these methods includes the use of the root to represent certain portions of the program so that once the root and encrypted program are reassembled, the root fills in the missing portions of the program. As can be seen in FIG. 11, the encrypt system 405 includes a stored seed module 434. It is to be understood that the seed can be transported along with the root and encrypted data if desired.

The access verification system 404 calculates the root in inverse algorithm module 416 and stores same in root module 418. This root is not heretofore known by the host computer 402. The access verification system 404 additionally includes a program store module 436 which stores the encoded or encrypted data or program supplied thereto by, for example, a floppy diskette which is encrypted by the encrypt system 405 in a secure environment. The access verification system 404 additionally includes a decryption module 438 which is provided the calculated root from root module 418 and the encrypted data from module 436. The decryption module 438 can decrypt or decipher the data or program so that it is usable by the host computer.

It is also to be appreciated that the root from more than one key may be required to be input to the computer in order to decrypt the data in decryption module 438. In other words, for very confidential data, several keys with several different passwords my be required to be used, with the computer 402 calculating the root for each one, in order to decrypt the data. In addition, there can be a requirement that a user may be required to enter a memorized personal identification number or other identification sources in addition to using the access key in order to decrypt the software.

Figure 12:
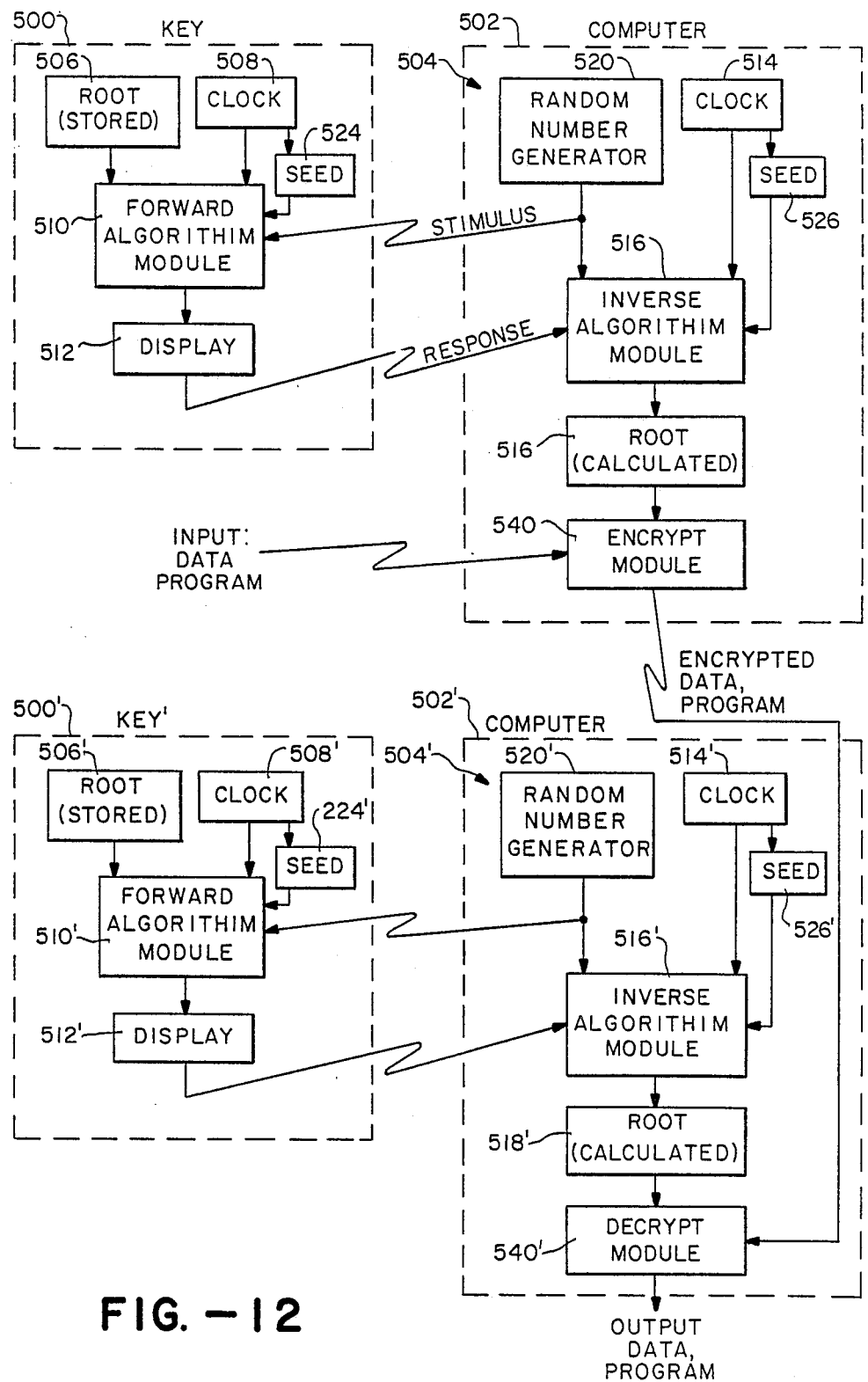
FIG. 12 depicts a block diagram of a secured communication system for communicating secure data between two computers at distant locations.

As can be seen in FIG. 12, a secure communications system for transmitting secure data from one computer to another, which computers can be adjacent or located distant cities apart, is presented. The system includes many of the similar components previously described. In the secure communications system, components which are similar to components of the past figures are given the same numbers but in a 500 series or a 500' series designation. In the present embodiment, the access key verification system in addition to the above elements includes an encryption module 540, and access key verification system 504' includes a decryption module 540'. It is to be understood that although this embodiment depicts seed modules and stimulus or random number generators, similar systems can be constructed without either one or both of these elements, as is shown in FIGS. 7 and 8. In the present embodiment of this invention, it is further to be understood that the present communications system works whether or not the forward algorithm module and inverse algorithm modules 510 and 516 have the same or different algorithms from modules 510' and 516'. Further this system works whether or not the clocks 508 and 514 are synchronized with clocks 508' and 514'. Additionally this system works whether or not the random number generator 520 is the same as or different from the random number generator 520'. Thus for this system to work, it is only necessary that the root stored in root module 506 is the same as the root stored in module 506'. It is to be understood that this root is only known to the keys 500 and 500'. The root is not known to or stored in the host computers 502 and 502' until communicated thereto by the password.

As can be seen in FIG. 12, using the procedure established in FIG. 8, the key communicates the root to the access key verification system 504 so that the root can be calculated and stored in root module 518. The root so calculated is used to encrypt the incoming data or program in encryption or encipher module 540 in one of the many ways common in the art. The encrypted program is then communicated through a variety of possible ways either electronically or by batch method to the other host computer 502' where it is deposited in the decryption or decipher module 540'. As with key 500, key 500' is used to transfer the root stored therein to the access key verification system 504' so that the root can be calculated in root calculation module 518'. The calculated root can then be communicated to the decryption module 540' so that, by methods known in the art, the encrypted data or program can be decrypted for use by the host computer.

Figure 13:
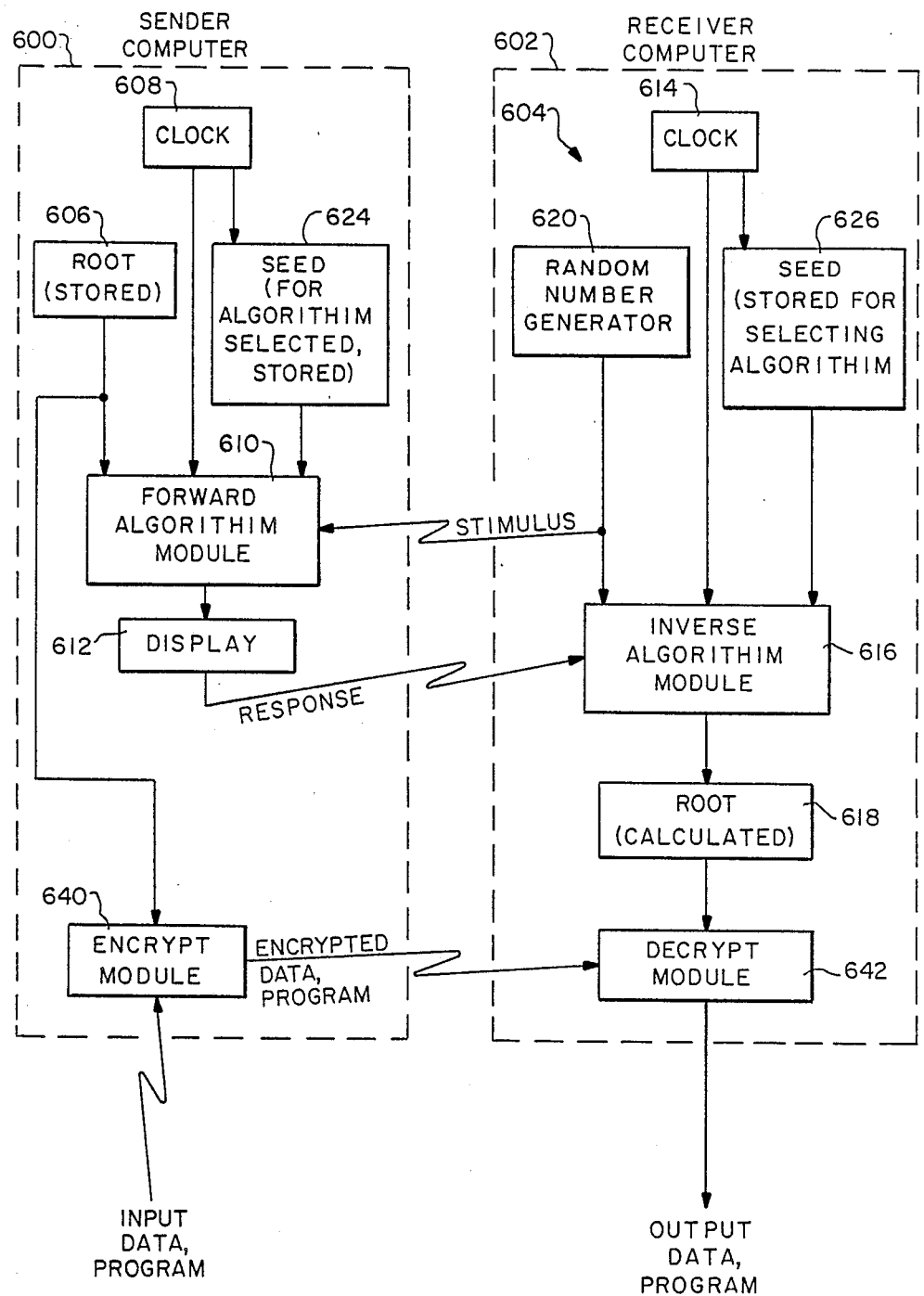
FIG. 13 depicts another embodiment of a secured communications system for communicating secure data between two computers.

Yet another secure communications system of the present invention is depicted in FIG. 13. Unlike the secure communication system of FIG. 12, in the present system all the forward and inverse algorithms must be compatible and the clocks synchronized and the seed values the same or related in a known relation. The root value need not be known by the distant computer or receiver. As with past embodiments, it is important to realize that the present embodiment can be constructed with or without the seed module and with or without the stimulus number generator. It is also important to note that the present system does not use an access key, that function being taken over by computer 600 which is the sender. Computer 602 is the receiver or what used to be referred to as the host computer. In the present embodiment, both the root and the data are communicated from the sender 600 to the receiver 602 in a secure encrypted fashion As can be see by FIG. 13, the invention operates in much the same manner that the embodiment of FIG. 10 operates. In addition, the sender 600 includes an encryption module 640 to which is communicated the root stored in root storage module 606 and the data or program input to the computer. The encryption module 640 then encrypts the program and communicates the encrypted program or data to the decryption module 642 of the receiver 602 where the root calculated by the inverse algorithm module 616 and stored in the root module 618 is applied to the decryption module 642 to decrypt or decipher the data so that it can be used by the host computer. When these events all occur successfully, the receiver knows that the sender has the correct root, seed and algorithm to afford access. It is to be understood that the sender and the receiver can be in distant locations and that security is increased due to the fact that both the root and the data to be sent are encrypted as taught by the present invention.

It is to be understood that a single key such as key 300 with a single root can be used for all of the above functions, including computer access management, software protection, and secure information communications.

Figure 14:
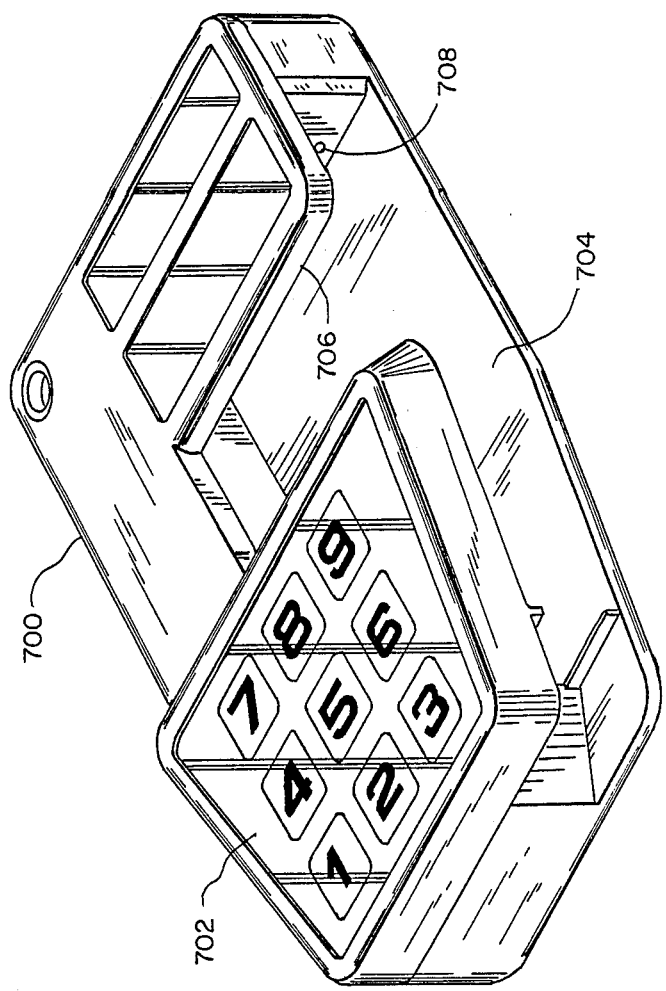
FIG. 14 depicts an embodiment of the key pad of the invention.

Another aspect of the invention includes the keypad 700 depicted in FIG. 14. The keypad 700 includes a key membrane 702, a slot 704 for receiving the key such as key 12 in FIG. 1, an opening 706 which allows the display 18 of the key of FIG. 1 to be read, and a set of excitation devices 708 such as, for example, LEDs or incandescent bulbs. FIG. 15 depicts a schematic of the keypad accessory 700 includes a microprocessor 710 which is powered by battery 712. Any input on key membrane 702 is interpreted by the microprocessor 710 and output as a series of excitations or flashing lights on the station display 708.

The purpose of the keypad 700 is for use in situations where there is no appropriate video display to excite the sensors of the key 12 as depicted in FIG. 1. In such a situation as, for example, where the output from the computer may be in the form of a printer output or other output which cannot be interpreted by the sensors, the stimulus output can be entered into the key through the use of the key membrane 702 of the keypad 700. The microprocessor then directs the excitation device 708 to produce the correct pattern of flashing lights. With the access key, such as key 12 in FIG. 1, inserted into the slot 704, the sensors of the key 12 are positioned adjacent the excitation devices 708 so that the output from the excitation devices can be sensed by the sensors of the key to communicate the stimulus or random number from the host computer through the keypad 700 to the access key. Accordingly the usefulness of the present invention can be expanded to systems that do not have appropriate video displays which can provide excitation signals for the sensors of the access key.

It is to be understood that key 300 can additionally be constructed so that it has a keypad membrane or keyboard such as membrane 702 of keypad 700. So configured data could be input to key 300 either through the sensors 28 or through a keypad membrane such as membrane 702.

In yet a further embodiment of the invention, the access key verification means provides a flashing signal on the screen for communicating with the sensors of the key as shown in FIG. 1. The optical signal has a preferred optical communication protocol (FIG. 16) which is time independent, immune to high noise levels, and bilaterally symmetrical. This optical communication protocol consists of two optical differential pairs, such as pairs A+, A− and B−, B+ as shown in FIG. 16. For each pair, one field is designated as the positive field and the other field is designated as the negative field. If the positive field is illuminated more than the negative field, a logic 1 will result for that pair. If the negative field is illuminated more than the positive field, a logic 0 results. Ideally, if both fields have the same illumination level (within the same tolerance thresholds) the previous valid logic level results. Thus, for example, in the first pair at the top of FIG. 16, the pair A would be a 1 and the pair B would be a 0 (the hatched area representing the illuminated field). At any given instant, one pair is defined to be the clock (pair B−, B+ in pairs 800) and the other pair (A+, A−) defined to be the data. Only one pair is allowed to change at a time. When the clock side transitions, the current state of the data is read and the clock side is defined to be the new data side. The new data side can then change as often as desired without affecting the data stream. When the data side is settled in the correct state for the next bit to be transitioned, the new clock side transitions. The data side is read and then becomes the clock side again. Thus the clock and data side alternate on each data bit. The command "invert strobe" in fact sets the data side and then inverts the clock side.

As the signal is time-independent, the actual transition can be as slow as desired. Thus there is independence from the "contact bounce" effect as multiple transitions on the data side are ignored. As a further advantage, with differential signals, low thresholds, slow interchange rates, good common mode rejection, and tolerance of data that has a low signal-to-noise ratio, the system operates with a high noise immunity, and thus works well in various light environments. A further advantage is that since the determination of the clock side versus the data side is made on each transition, the system has bilateral symmetry after at most one bit has been read. In other words, the signal can be read upside down as well as right side up.

Figure 17:
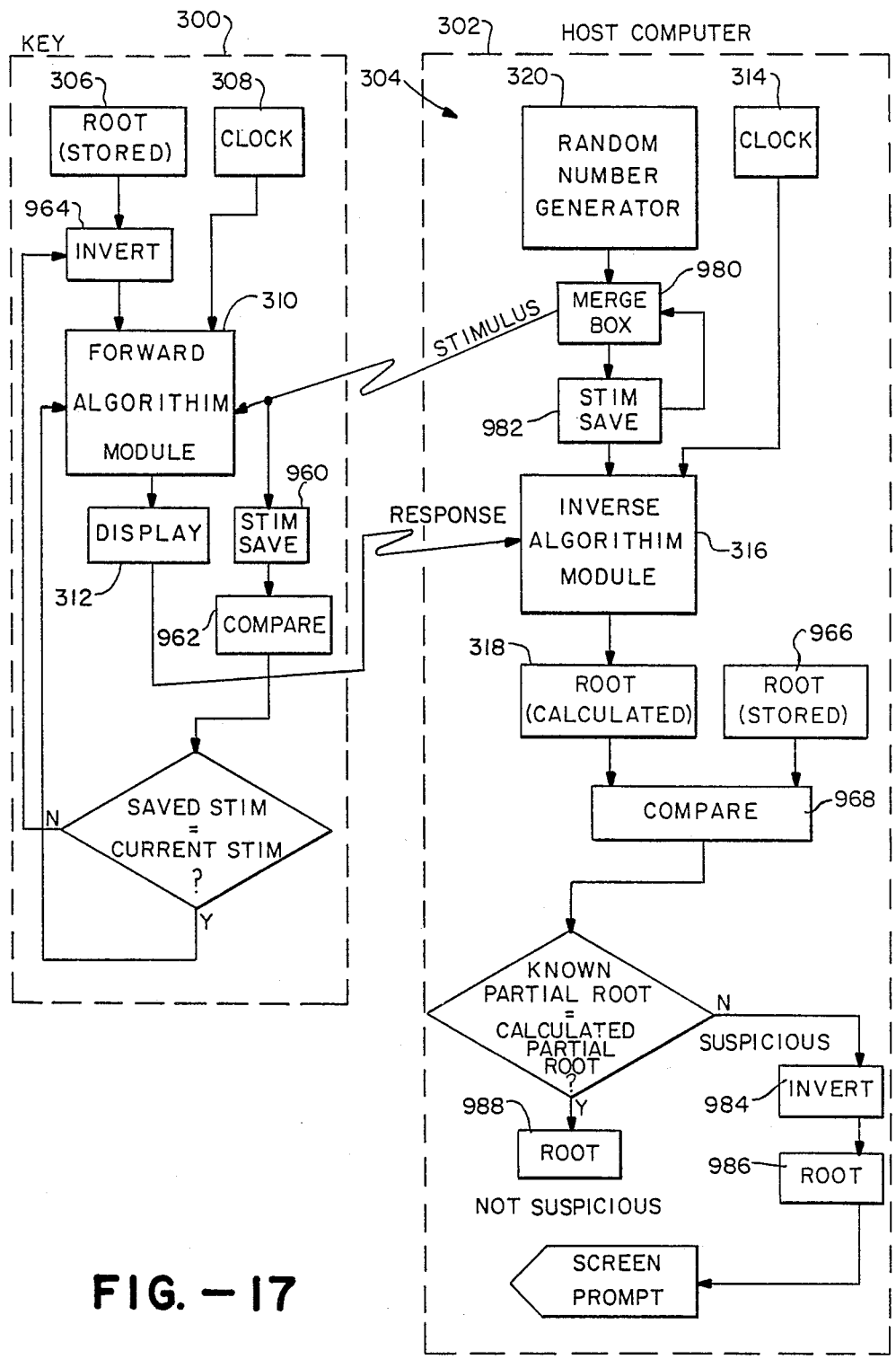
FIG. 17 depicts a block diagram of an embodiment of the invention for detecting misuse of the access key.

The embodiment of the invention of FIG. 17 is a system for determining if the access key has been misused. With respect to the data or program copy-protect system of FIG. 11, it is to be understood that the access key configuration does not prevent an individual from running several copies of the same commercial program using the same key. Presently one of the problems facing software vendors is the sharing of software in an office environment. An organization may purchase one copy of a program and have several employees use it simultaneously.

Historically, the problem of shared programs has been dealt with ineffectually. Many so-called solutions involve artificial restrictions on the presence of a particular floppy disk or the user's ability to make legitimate disk backup copies.

The present invention has a suspicion feature which detects when the key is used more or less frequently than a particular copy of software. In this approach at least a portion of the previous stimulus number (SN(t−1)) from the random number generator is saved in stimulus save module 982 of the host computer 302. This saved portion of the stimulus number is merged in merge box 980 with the next stimulus number (SN(t)) generated and communicated to the key 300. The key 300 also saves the previous stimulus number (SN(t−1)) in stimulus save module 960. This saved portion of the previous stimulus number is compared inside the key in comparator 962 with the saved portion of the stimulus number which is now a portion of the current stimulus number. If the two numbers match, a normal response or password is generated. If the two numbers do not match, at least one bit of the root is inverted by inverter 964 and the password is accordingly generated. For this feature, the host computer must know what at least one bit of the root should have been. This at least one bit is permanently stored in root store module 966. The host computer extracts or calculates the root in the normal fashion and checks the at least one bit of the root against the known bit of the root saved in root store module 966. These values are compared in comparator 968. If the values match, the key is not suspicious that the root held in root module 988 has not been inverted by key 300, and use of the key is synchronized to use of the software. If the saved value does not match, the key is suspicious and has inverted the root now in module 318, and the possibility of a security breach exists. The calculated value of the root, which is now inverted, is then reinverted in module 984, which is now inverted, before any subsequent use. This feature cannot prevent false uses of the key, but can detect them and provide screen prompts and either allow or disable further use of the software as desired.

Although several embodiments of the invention have been shown and described, it will be obvious that other adaptations and modifications can be made without departing from the true spirit and scope of the invention.

What is claimed is:

1. Apparatus for affording access by a user to a computer and/or information residing in a computer, and/or for affording secure communications and comprising an access key capable of generating a password and of being transported independently of the computer, and an access key for verification means adapted to be resident in the computer, for allowing access and use of the software program wherein:

said access key includes:
(a) first clock means for generating a signal;
(b) means for storing a root;
(c) forward algorithm means coupled to said clock means and root storing means for encrypting the root, responsive to the signal from said clock means, into a password;

said access key verification means includes:
(a) second clock means for generating a signal;
(b) means for receiving the password;
(c) inverse algorithm means coupled to said second clock means for decrypting the password and for calculating the root;
(d) means for generating a stimulus and for communication said stimulus to said inverse algorithm means and said access key;
(e) said inverse algorithm means including means for using the stimulus to calculate the root from the password;

said access key includes:
(a) means for receiving the stimulus and communicating the stimulus to said forward algorithm means;
(b) wherein said forward algorithm means includes means for combining the stimulus with the root to produce the password;

(c) means for saving at least a portion of stimulus member;

(d) means for comparing the saved portion of the stimulus number with the next available stimulus number;

(e) means for inverting at least part of the root before the root is communicated to the forward algorithm module responsive to the comparing means if the saved portion does not have a predescribed relationship with the next available stimulus number; and said access key verification means includes:

(a) second means for saving at least a portion of the stimulus number;

(b) means for merging the saved portion of the stimulus number with the next stimulus number;

(c) second means for storing at least a portion of the root;

(d) means for comparing the portion of the root number saved in the second storing means with the calculated root;

(e) means for generating a suspicion signal depending on whether there is a predetermined relationship between the calculated root and the saved portion of the root.

2. Apparatus for affording access by a user to a computer and/or information residing in a computer, and/or for affording secure communications and comprising an access key capable of generating a password and of being transported independently of the computer, and an access key verification means adapted to be resident in or function with the computer, for allowing access and use of the software program wherein:

said access key includes:

(a) first clock means for generating a signal;

(b) means for storing a root;

(c) forward algorithm means coupled to said clock means and root storing means for encrypting the root, responsive to the signal from said clock means, into a password;

said access key verification means includes:

(a) second clock means for generating a signal;

(b) means for receiving the password;

(c) inverse algorithm means coupled to said second clock means for decrypting the password and for calculating the root; and wherein the computer has a video display, which can display another signal from the access key verification means, and wherein said apparatus further comprising:

said access key verification means including:

(a) a stimulus number generating means for generating a stimulus number;

(b) means for generating said another signal on the video display that is representative of said stimulus number; and said access key further including:

(a) at least one sensor accessible from the exterior of said access key so that juxtaposition of the access key and the display efforts excitation of the sensor by the another signal;

(b) means coupled to said sensor for using the another signal to produce the stimulus number;

(c) said forward algorithm means including a means for combining the stimulus number with the signal from the clock means to produce the password; and wherein the signal on the display is comprised of two optical differential pairs; and wherein each optical pair is comprised of a first field and a second field, one of which fields can be illuminated more than the other field to communicate selectively a logical one or a logical zero signal.

3. The apparatus of claim 2 wherein one of said optical differential pairs represent a data signal and the other represents a clock signal.

4. The apparatus of claim 3 wherein the pairs alternate being the data signal and the clock signal.

5. A system for transmitting information in a secure fashion comprising:

a first access key capable of generating a password and adapted to be transported independently of a computer;

wherein said first access key includes:

(a) first means for storing a root;

(b) first forward algorithm means coupled to said first root storing means for encrypting the root into a password;

a first access key verification means adapted to reside in or function with a computer for receiving a password generated by the first access key and for encrypting the information to be transmitted based on the root calculated from the password;

wherein said first access key verification means includes:

(a) first inverse algorithm means for receiving and decrypting the password for calculating the root in order to encrypt the information;

(b) encrypt module means for using the root to encrypt the information;

a second access key capable of generating another password and adapted to be transported independently of another computer;

wherein said second access key includes:

(a) second means for storing the root;

(b) second forward algorithm means coupled to said second root storing means for encrypting the root into another password;

a second access key verification means adapted to reside in or function with the another computer for receiving the another password generated by the second access key and for decrypting the encrypted information based on a value calculated from the password; and wherein said second access key verification means includes:

(a) second inverse algorithm means for receiving and decrypting the another password for calculating the root in order to decrypt the information;

(b) decrypt module means for using the root to decrypt the information.

6. The system of claim 5 wherein:

at lease one of said first and second access key verification means includes:

(a) means for generating a stimulus and for communicating said stimulus to at least one of said first and second inverse algorithm means respectively, and to at least one of said first and second access keys respectively;

at least one of first and second access keys includes:

(a) means for receiving the stimulus and communicating the stimulus to at least one of said first and second forward algorithm means respectively.

7. A system for protecting information residing in a computer and/or for affording secure communication comprising:
  means separate from the computer for encrypting information in accordance with a root;
  an access key capable of generating a password in accordance with the root and of being transported independently of a computer;
  wherein said access key includes:
  (a) first clock means for generating a signal that is dependent on the elapse of time;
  (b) means for storing the root;
  (c) forward algorithm means coupled to said clock means and root storing means for encrypting the root into a password responsive to the signal from said clock means;
  an access key verification means, adapted to reside in or function with the computer, for using the password to calculate the root and to decrypt the encrypted information with the root;
  wherein said access key verification means includes:
  (a) second clock means for generating a signal that is dependent on the elapse of time;
  (b) means for receiving the password;
  (c) inverse algorithm means coupled to said second clock means for decrypting the password for calculating the root.

8. The apparatus of claim 7 wherein:
  said access key verification means includes:
  (a) means for generating a stimulus and for communication said stimulus to said inverse algorithm and said access key;
  said access key includes:
  (a) means for receiving the stimulus and communicating the stimulus to said forward algorithm means;
  (b) wherein said forward algorithm means includes the means for combining the stimulus with the root to produce the password; and
  said access key verification means includes:
  (a) said inverse algorithm means including means for using the stimulus to calculate the root from the password.

9. Apparatus for affording access by a user to a computer and/or information residing in a computer, and/or for affording secure communications and comprising an access key capable of generating a password and of being transported independently of the computer, and an access key verification means adapted to be resident in or function with the computer, for allowing access and use of the software program wherein:
  said access key includes:
  (a) first clock means for generating a signal;
  (b) means for storing a root;
  (c) forward algorithm means coupled to said clock means and root storing means for encrypting the root, responsive to the signal from said clock means, into a password;
  said access key verification means includes:
  (a) second clock means for generating a signal;
  (b) means for receiving the password;
  (c) inverse algorithm means coupled to said second clock means for decrypting the password and for calculating the root; and
  wherein said signal of said first clock means includes a first signal having shorter time intervals and a second signal having longer time intervals comprised of more than one of the shorter time intervals and with:
  said forward algorithm means including means for selecting among a plurality of algorithms;
  said first signal for encrypting the root for any selected algorithm;
  said second signal for selecting among the plurality of algorithms for encrypting the root.

10. The apparatus of claim 9 wherein said access key includes:
  means for displaying the password for a predetermined time frame and for preventing the generation of another password for said predetermined time period.

11. A system for communicating secure information including:
  an information sender having
  (a) a first clock means for generating a signal that is dependent on the elapse of time;
  (b) means for storing a root;
  (c) forward algorithm means coupled to said clock means and root storing means for encrypting the root, responsive to the signal from said first clock, into a password and for sending said password;
  (d) encryption means coupled to said root storing means for encrypting information input to the sender in accordance with the root and for sending encrypted information;
  an information receiver having:
  (a) a second clock means for generating a signal that is dependent on the elapse of time;
  (b) inverse algorithm means coupled to said second clock means for receiving the password and for calculating said root in accordance with the signal from the second clock means and said password;
  (c) decryption module means for receiving said encrypted data and coupled to said inverse algorithm means for receiving said calculated root and for decrypting the encrypted data.

12. The system for claim 11 wherein:
  said information receiver includes:
  (a) means for generating a stimulus and for communicating said stimulus to said inverse algorithm means and to said sender;
  said sender include:
  (a) said forward algorithm means for additionally receiving the stimulus and for combining the stimulus with the root to produce the password;
  said receiver includes:
  (a) said inverse algorithm for additionally using said password and stimulus to calculate the root.

13. The system of claim 12 wherein:
  said sender includes:
  (a) first means for storing a seed and for communicating the stored seed to said forward algorithm means;
  (b) said forward algorithm means includes means for selecting among a plurality of algorithms responsive to the stored seed.

14. The system of claim 13 wherein:
  (a) said seed is a time-dependent algorithm; and
  (b) the output from said seed storing means changes with time.

15. A system for transporting valuable data in a highly portable, secure fashion comprising a portable key in which the valuable data can be stored and data extraction means adapted resident in or function of a computer for extraction of the data from the key wherein:
  said key includes:

(a) first clock means for generating a signal that is dependent on the elapse of time;
(b) means for storing the data;
(c) forward algorithm means coupled to said clock means and data storing means for encrypting the data into a password responsive to the signal from said clock means;

said data extraction means includes:
(a) second clock means for generating a signal that is dependent on the elapse of time;
(b) means for receiving the password;
(c) inverse algorithm means coupled to said second clock means for decrypting the password in order to calculate the data.

16. The system of claim 15 wherein: said data extraction means includes:
(a) means for generating a stimulus and for communicating said stimulus to said inverse algorithm means and said key;

said key includes:
(a) means for receiving the stimulus and communicating the stimulus to said forward algorithm means;
(b) wherein said forward algorithm means includes means for combining the stimulus with the data to produce the password; and said access key verification means includes
(a) said inverse algorithm means including means for using the stimulus to calculate the data.

17. A system for affording access by a user to a computer and/or information residing in a computer with an output device, comprising access key verification means adapted to be resident in or function with the computer, for verfying an encrypted password and allowing access to the computer and/or use of the information, an access key capable of generating an encrypted password and of being transported independently of the computer, and a keypad for facilitating communication between the access key and the access key verification means, wherein:

said access key verification means includes:
(a) first clock means for generating a signal that is dependent on the elapse of time;
(b) a stimulus number generating means for generating a stimulus number;
(c) means for generating a signal on the display that is representative of said stimulus number; and said access key includes:
(a) second clock means for generating another signal that is dependent on the elapse of time;
(b) means for storing a root;
(c) at least one sensor accessible from the exterior of said access key, said keypad includes:
(a) means for entering the stimulus number
(b) excitation means communicating with the stimulus entering means for exciting the sensor of the access key when the excitation means of the keypad is adjacent the sensor of the access key for communicating the stimulus number to the access key;

said access key further includes:
(a) means coupled to said sensor for using the signal to produce the stimulus number;
(b) password generating means for encrypting said another signal produced by said second clock means and said stimulus number and said root for producing an encrypted password;
(c) displaying means communicating with the password generating means for display at least part of said encrypted password, so that the user can input the encrypted password into the computer;

wherein said access key verification means further includes:
(a) means for decrypting the encrypted password displayed on the access key to calculate said root.

* * * * *